(12) United States Patent
Huang et al.

(10) Patent No.: US 10,341,027 B2
(45) Date of Patent: Jul. 2, 2019

(54) OPTICAL TRANSMITTER AND CONTROL METHOD FOR OPTICAL TRANSMITTER

(71) Applicant: FUJITSU LIMITED, Kawasaki-shi, Kanagawa (JP)

(72) Inventors: Guoxiu Huang, Kawasaki (JP); Hisao Nakashima, Kawasaki (JP); Yuichi Akiyama, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/035,650

(22) Filed: Jul. 15, 2018

(65) Prior Publication Data

US 2019/0028205 A1 Jan. 24, 2019

(30) Foreign Application Priority Data

Jul. 18, 2017 (JP) .................................. 2017-139344

(51) Int. Cl.
*H04B 10/04* (2006.01)
*H04B 10/564* (2013.01)
(Continued)

(52) U.S. Cl.
CPC ..... *H04B 10/564* (2013.01); *H04B 10/07955* (2013.01); *H04B 10/516* (2013.01)

(58) Field of Classification Search
CPC ............ H04B 10/564; H04B 10/07955; H04B 10/516; H04B 10/532; H04B 10/5561; H04B 10/505; H04B 10/541; H04B 10/50572; H04B 10/50575; H04B 10/548; H04B 10/58; H04B 2210/254; H04B 10/25133; H04B 10/2543; H04B 10/2569; H04B 10/5057; H04B 10/5051; H04B 10/50577; H04B 10/0775; H04B 10/5053;
(Continued)

(56) References Cited

U.S. PATENT DOCUMENTS 6,031,647 A * 2/2000 Roberts ................ H04B 10/503
398/197
6,268,945 B1 * 7/2001 Roberts ................ H04B 10/503
398/197
(Continued)

FOREIGN PATENT DOCUMENTS

JP 2011-232553 11/2011
JP 2012-129606 7/2012

*Primary Examiner* — Hibret A Woldekidan
(74) *Attorney, Agent, or Firm* — Fujitsu Patent Center

(57) ABSTRACT

An optical transmitter includes, a processor that receives an input data signal from an outside and performs rotation processing for periodically or repeatedly rotating a polarization state or phase of the optical output signal upon the input data signal, an optical modulator that modulates light transmitted from a light source based on the input data signal, a digital-to-analog converter that converts an output of the processor into an analog electric signal, a driving circuit that amplifies an output of the digital-to-analog converter and drives the optical modulator, and a monitoring control circuit that monitors an optical output signal output from the optical modulator and adjusts at least one of an output of the digital-to-analog converter and a gain of the driving circuit based on a result of monitoring of the optical output signal.

14 Claims, 23 Drawing Sheets

(51) Int. Cl.
*H04B 10/516* (2013.01)
*H04B 10/079* (2013.01)

(58) Field of Classification Search
CPC ........ H04B 10/50593; H04B 10/50595; H04B 10/588; H04B 10/0795; H04B 10/2942; H04J 14/06; G02B 6/2786
USPC .......... 398/38, 152, 182–184, 192–195, 198, 398/197, 37
See application file for complete search history.

(56) References Cited

U.S. PATENT DOCUMENTS

| | | | |
|---|---|---|---|
| 7,715,732 B2* | 5/2010 | Koh | G02F 1/0123 359/237 |
| 7,773,886 B2* | 8/2010 | Hainberger | H04B 10/2942 398/97 |
| 8,184,989 B2* | 5/2012 | Maeda | H04L 9/0852 380/256 |
| 8,412,047 B2* | 4/2013 | Tanaka | H04B 10/5053 398/102 |
| 8,417,126 B2* | 4/2013 | Mandai | H04J 14/06 398/152 |
| 8,879,925 B2* | 11/2014 | Akiyama | H04B 10/588 398/184 |
| 8,989,576 B2* | 3/2015 | Finot | H04B 10/299 398/180 |
| 9,294,200 B2* | 3/2016 | Mak | H04B 10/5055 |
| 9,654,226 B1* | 5/2017 | Bhandare | H04B 10/58 |
| 9,667,344 B2* | 5/2017 | Akiyama | H04B 10/07955 |
| 9,917,649 B2* | 3/2018 | Bhandare | H04B 10/58 |
| 2006/0127104 A1* | 6/2006 | Harley | H04B 10/5053 398/198 |
| 2010/0111531 A1* | 5/2010 | Tanimura | H04B 10/5055 398/65 |
| 2010/0272446 A1* | 10/2010 | Harley | H04B 10/5053 398/184 |
| 2012/0141130 A1* | 6/2012 | Nakashima | H04B 10/505 398/82 |
| 2012/0148260 A1 | 6/2012 | Akiyama et al. | |
| 2017/0331559 A1* | 11/2017 | Matsushita | H04B 10/07955 |
| 2018/0267340 A1* | 9/2018 | Rohde | G02F 1/0123 |

* cited by examiner

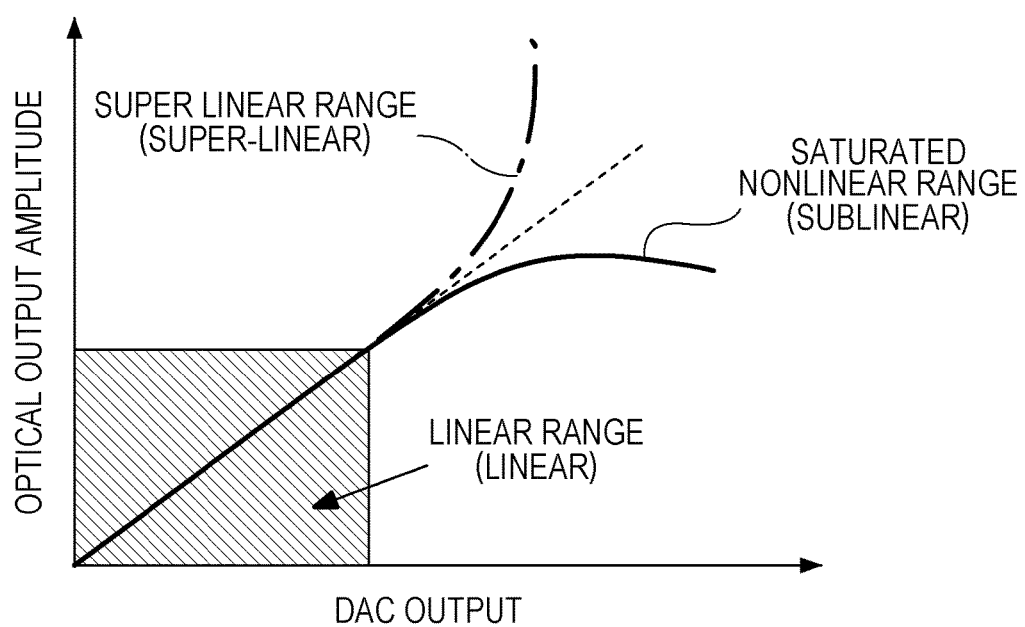

FIG. 3
BEFORE ROTATION
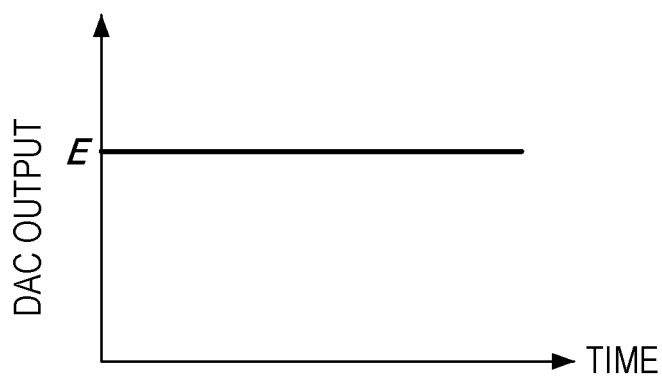
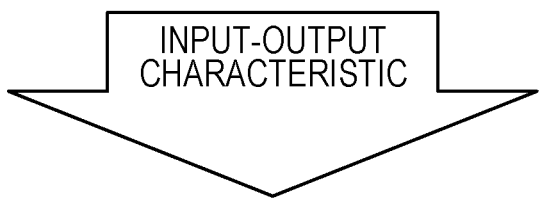
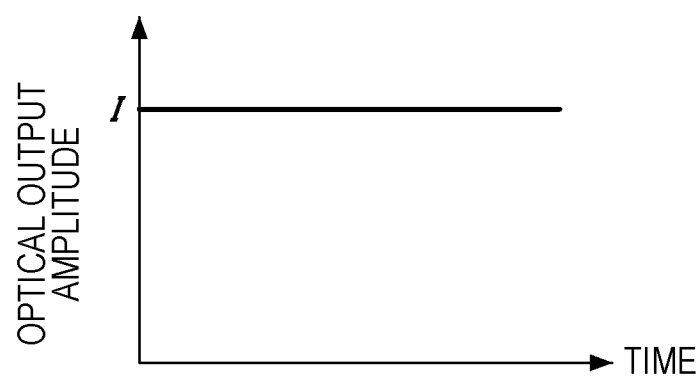

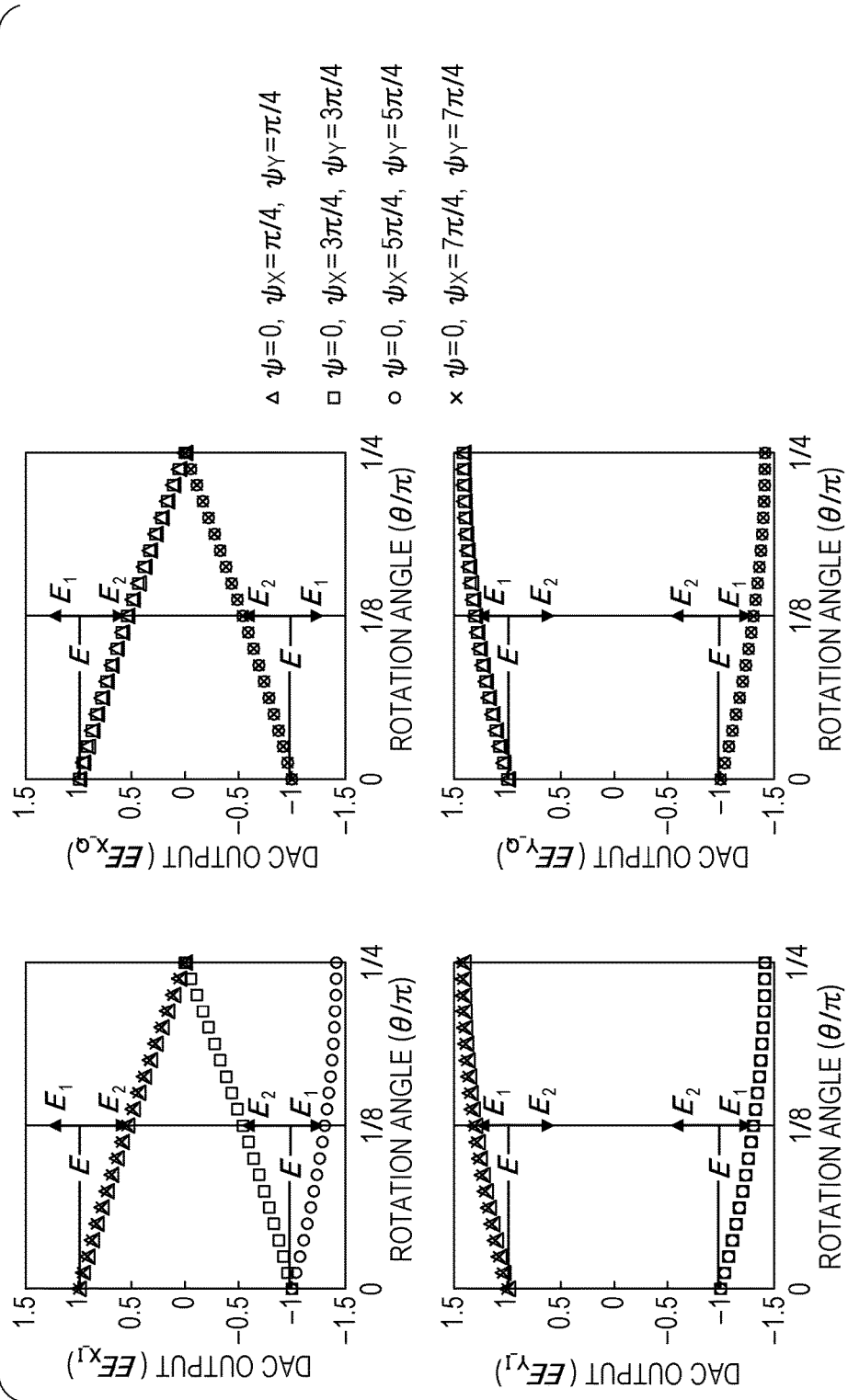

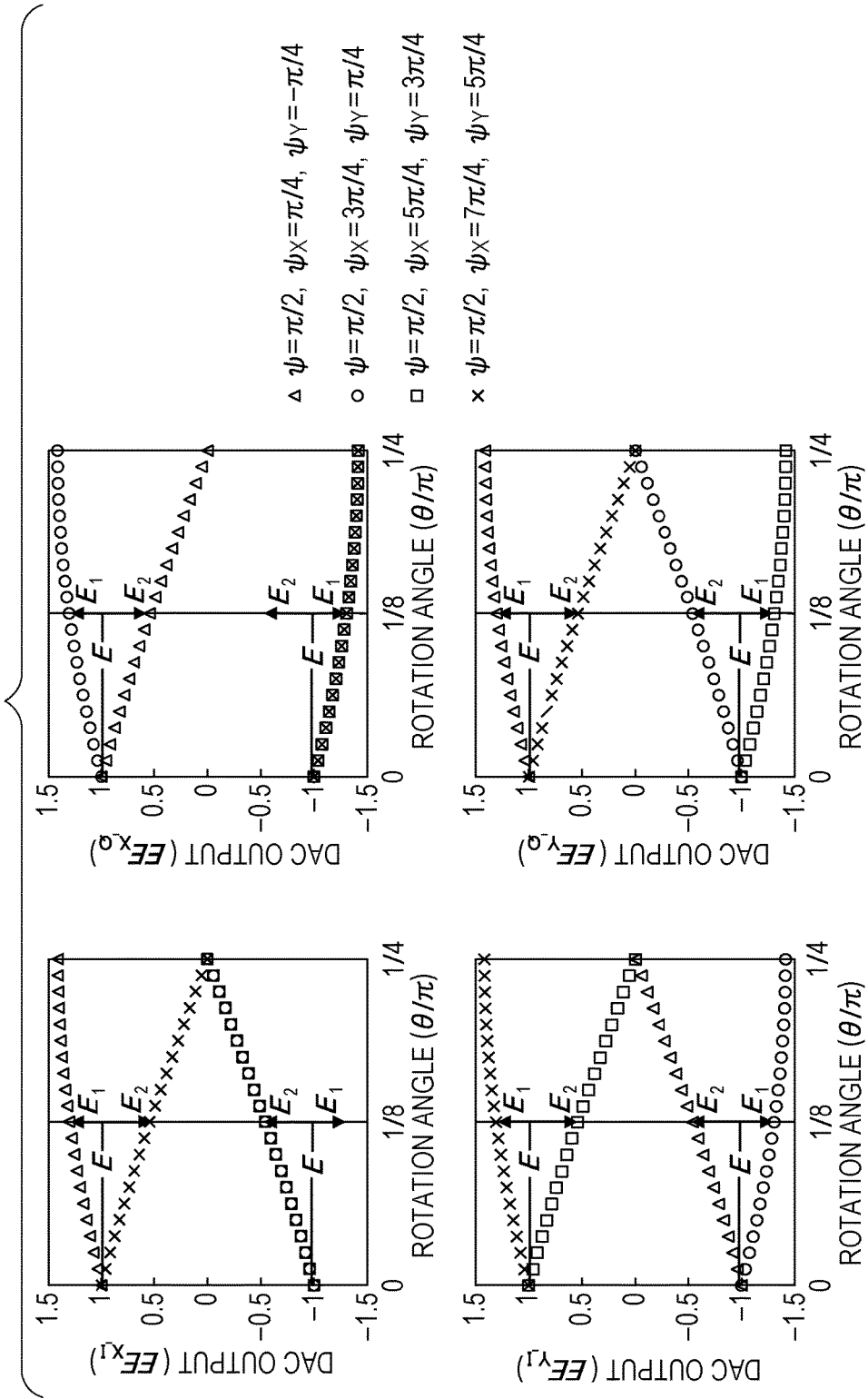

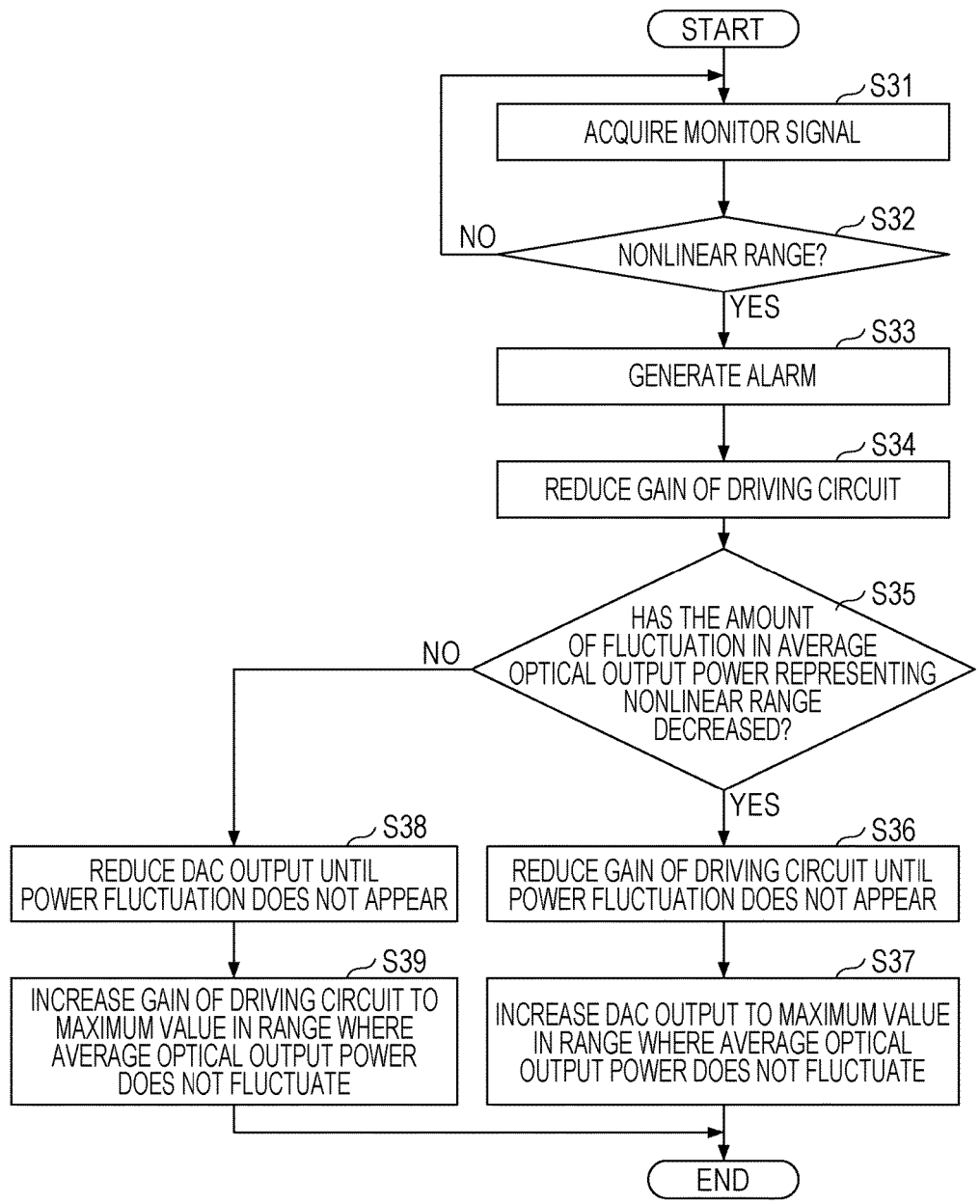

OPTICAL TRANSMITTER AND CONTROL METHOD FOR OPTICAL TRANSMITTER

CROSS-REFERENCE TO RELATED APPLICATION

This application is based upon and claims the benefit of priority of the prior Japanese Patent Application No. 2017-139344, filed on Jul. 18, 2017, the entire contents of which are incorporated herein by reference.

FIELD

The embodiment discussed herein is related to an optical transmitter and a control method for an optical transmitter.

BACKGROUND

In the transmission front end of optical communication, continuous light is modulated using an input data signal, so that an electric signal is converted into an optical signal to be transmitted. In high-speed long-distance optical transmission, an external modulation method is commonly used so as to avoid a problem with chirping. A method is disclosed of improving the quality of an optical signal generated by an optical modulator using digital signal processing in an optical transmitter employing an external modulation method (see, for example, Japanese Laid-open Patent Publication No. 2012-129606).

In a multi-level modulation method in which optical signals at a plurality of amplitude levels are generated on a transmission side, optical modulation is performed by linearly amplifying a converted analog electric signal. As illustrated in FIG. 1, the relationship between the output of a DAC and the output characteristic of an optical modulator has a linear characteristic in a certain range. The output of the DAC is connected to the input of a driving circuit. Since a driving signal amplified by the driving circuit is input into the optical modulator, the linearity illustrated in FIG. 1 corresponds to the input-output characteristic of the entire analog part from a DAC output to an optical output amplitude. For the sake of convenience, a region where an optical output is below the linearity is called a "saturated nonlinear range" and a region where an optical output is above the linearity is called a "super linear range". In order to output an optical signal with less distortion, the optical transmitter is used in a range where linear input-output characteristic is obtained. The linearity of the optical output characteristic with respect to the DAC output depends on the performance of the driving circuit and the optical modulator and also depends on a gain value set for the driving circuit. Before operation, the gain of the driving circuit is usually optimized to check the range where the input-output characteristic of the part from the output of a DAC to the output amplitude of an optical modulator has linearity.

The output of the DAC and the gain of the driving circuit decrease with time. The input-output characteristic may fluctuate depending on the changes in temperature and power supply voltage. During an operation, the optical transmitter is used with a margin in the range where the linearity is obtained. With the decreases in the output of the DAC and the gain of the driving circuit, the output power of an optical signal decreases and the noise immunity of a main optical signal is deteriorated. A configuration is therefore desired with which the gain of the driving circuit and/or the output of the DAC can be readjusted even during an operation.

A configuration is disclosed with which a linear electro-optical conversion is realized and the difference between an I-channel signal level and a Q-channel signal level is suppressed (see, for example, Japanese Laid-open Patent Publication No. 2011-232553). In this configuration, a low-frequency signal component is superimposed on the driving amplitude of a modulator, an optical signal is monitored, and the amplitudes of an I-channel driving signal and a Q-channel driving signal are adjusted to optimum driving amplitudes.

SUMMARY

According to an aspect of the embodiments, an optical transmitter includes, a processor that receives an input data signal from an outside and performs rotation processing for periodically or repeatedly rotating a polarization state or phase of the optical output signal upon the input data signal, an optical modulator that modulates light transmitted from a light source based on the input data signal, a digital-to-analog converter that converts an output of the processor into an analog electric signal, a driving circuit that amplifies an output of the digital-to-analog converter and drives the optical modulator, and a monitoring control circuit that monitors an optical output signal output from the optical modulator and adjusts at least one of an output of the digital-to-analog converter and a gain of the driving circuit based on a result of monitoring of the optical output signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a diagram illustrating the use of an optical transmitter in a linear range;

FIG. 3 is a diagram describing the determination of linearity based on a result of polarization rotation control or phase rotation control according to an embodiment;

FIGS. 13A to 13D are diagrams illustrating a DAC output value binarized in accordance with a rotation angle;

FIG. 21 is a flowchart illustrating another example of a process of optimizing the outputs of a DAC and a driving circuit.

DESCRIPTION OF EMBODIMENT

An embodiment will be described below with reference to the accompanying drawings.

Figure 2A:
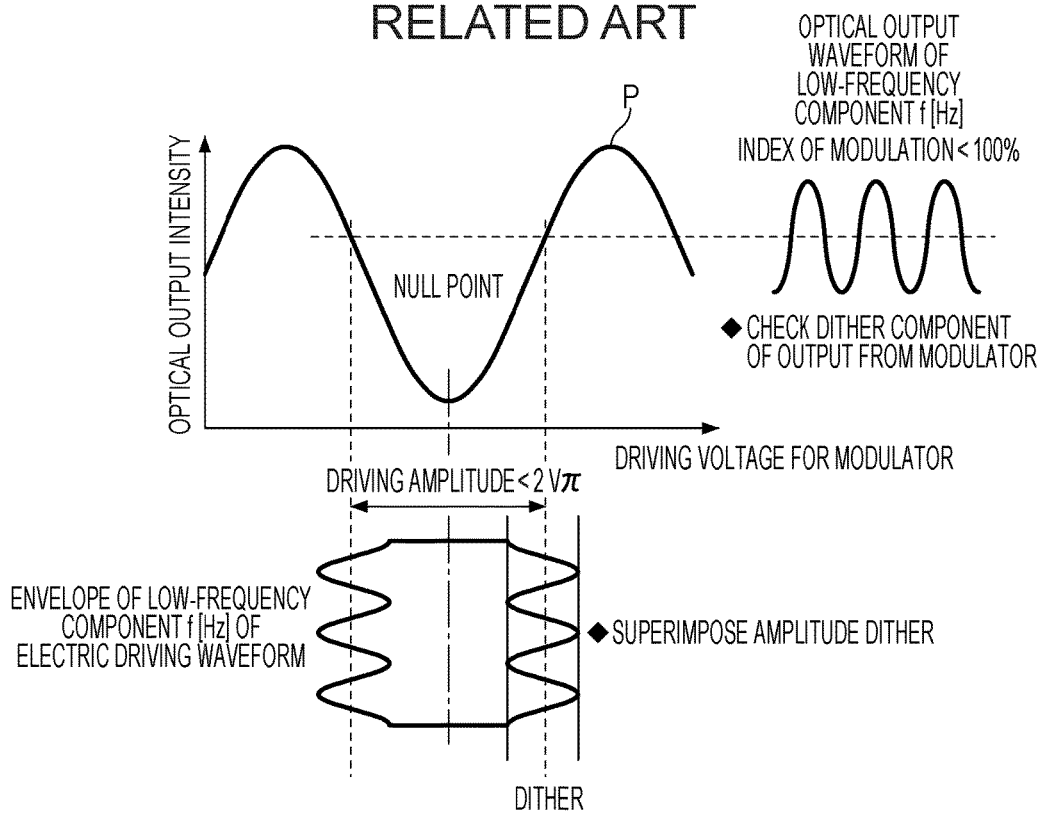
FIGS. 2A and 2B are diagrams describing the problem of a method of superimposing an amplitude dither.
Figure 2B:
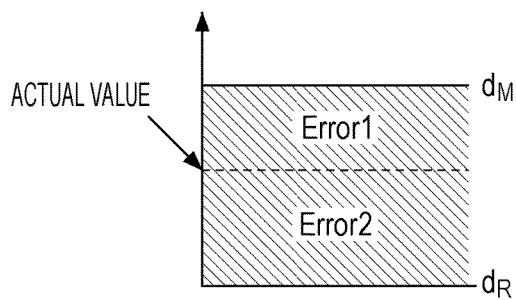

As illustrated in FIG. 2A, in a method of superimposing a low-frequency signal component (hereinafter referred to as an "amplitude dither") on the amplitude of a driving signal of a modulator, a driving waveform envelope is subjected to amplitude modulation. This method therefore affects the quality of an optical output signal. In both of a case where the output of a modulator is in a linear range and a case where the output of the modulator is brought into a nonlinear range (a region near the peak or valley of a curve of a voltage-to-optical output characteristic), the same dither component is detected from the output of the modulator. Accordingly, there is a necessity to differentiate between these cases. Furthermore, as illustrated in FIG. 2B, in a case where errors are included in both a reference dither component ($D_R$) to be superimposed and a detected measurement dither component ($D_M$) a determination error doubles.

In an embodiment, processing for applying periodic rotation to the polarization state or phase of an optical output signal is performed in digital signal processing. A known method of superimposing a monitor signal on an optical signal (for example, a method of performing intensity modulation upon the driving amplitude or bias voltage of an optical modulator) affects the quality of an optical main signal. However, in a method according to an embodiment, only an optical main signal is transmitted and the fluctuation in optical output power is monitored. It is therefore possible to suppress the influence on the quality of an optical output signal and appropriately and easily check whether the input-output characteristic of the analog part from a DAC output to an optical output amplitude is in a linear range.

Figure 4:
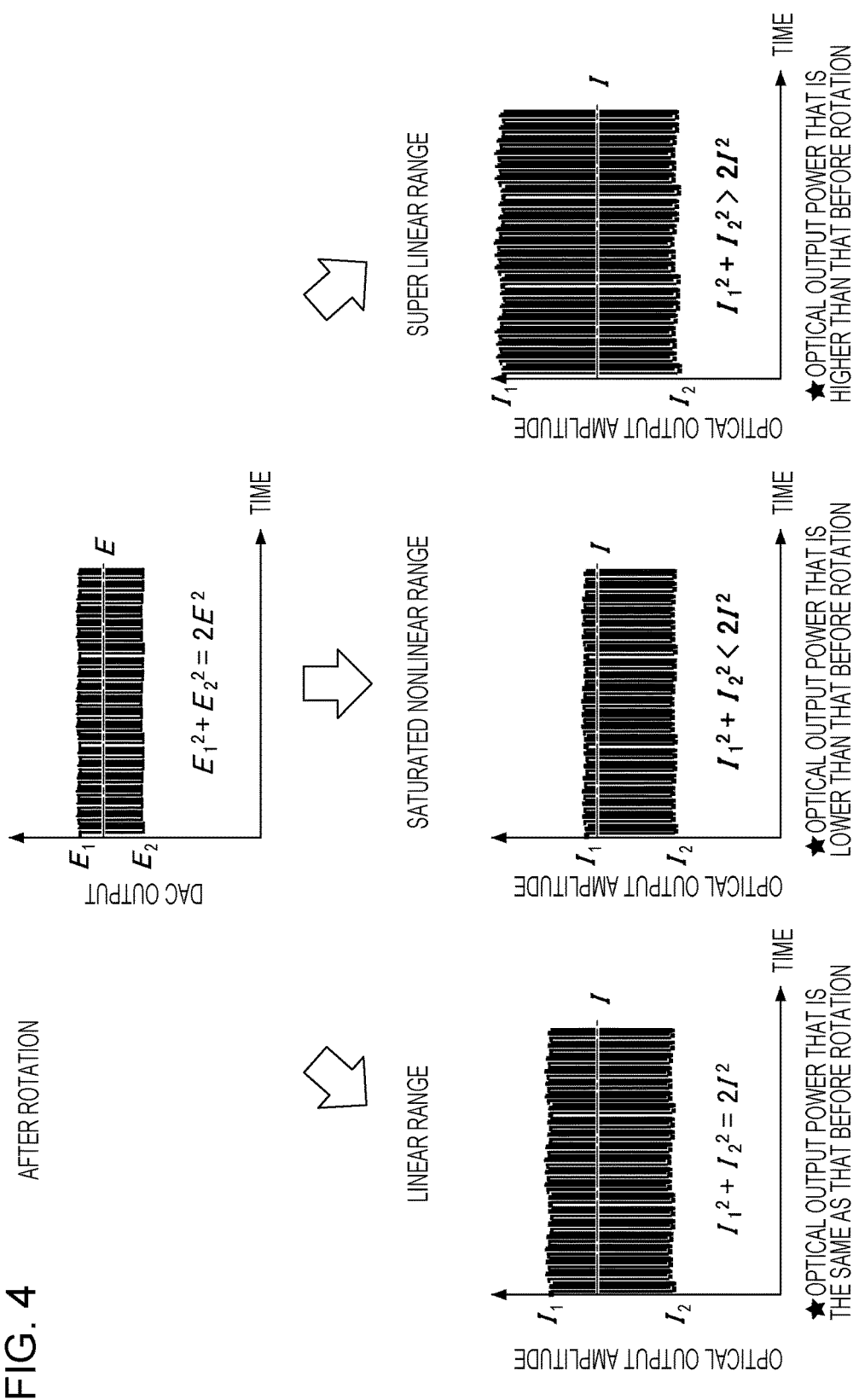
FIG. 4 is a diagram describing the determination of linearity based on a result of polarization rotation control or phase rotation control according to an embodiment.

FIGS. 3 and 4 are diagrams describing the principle of determination of linearity based on a result of polarization rotation control or phase rotation control according to an embodiment. The polarization state or phase of an optical output signal of an optical modulator is periodically or repeatedly rotated for the monitoring of optical output power. The periodic or repeated rotation applied to the polarization state or phase of an optical output signal is hereinafter referred to as a "rotation dither" for the sake of simplicity. FIG. 3 illustrates the state before rotation, and FIG. 4 illustrates the state after rotation. For the simplification of explanation, an exemplary case where the output value of a DAC is single is illustrated in FIGS. 3 and 4. However, the control of linearity using a rotation dither is also applicable to multi-level modulation. The rotation of the phase or polarization state of an optical output signal is set by a processor (DSP).

Referring to FIG. 3, in a case where the addition of a rotation dither to a phase or polarization is not performed, a single signal (electric field) is output from a DAC in response to the input of a certain logical value. The amplitude (intensity) of an optical signal output from an optical modulator is also invariable.

Referring to FIG. 4, in a case where rotation is applied to polarization or a phase, the output value of a DAC is binarized to an electric field $E_1$ whose intensity is higher than an electric field intensity E obtained before rotation and an electric field $E_2$ whose intensity is lower than the electric field intensity E and the relationship of $E_1^2+E_2^2=2E^2$ is satisfied.

In a case where the input-output characteristic of the part from the output of a DAC to the output amplitude of an optical modulator is in a linear range, the amplitude of an optical output is between an amplitude $I_1$, which is larger than an amplitude I obtained when the application of rotation is not performed, and an amplitude $I_2$ smaller than the amplitude I as illustrated in the drawing on the left side. At that time, the relationship of $I_1^2+I_2^2=2I^2$ is satisfied and average optical output power is the same as that obtained before the application of rotation.

In a case where the input-output characteristic of the part from the output of a DAC to the output amplitude of an optical modulator falls below the linearity under this rotation control (the input-output characteristic is in the saturated nonlinear range illustrated in FIG. 1), the amplitude of an optical output fluctuates between $I_1$ and $I_2$ as illustrated in the lower drawing at the center and the relationship of $I_1^2+I_2^2<2I^2$ is satisfied. Average optical output power of the optical modulator is smaller than that obtained before the application of rotation.

In a case where the input-output characteristic of the part from the output of a DAC to the output amplitude of an optical modulator exceeds the linearity (the input-output characteristic is in the super linear range illustrated in FIG. 1), the amplitude of an optical output fluctuates between $I_1$ and $I_2$ as illustrated in the drawing on the right side and the relationship of $I_1^2+I_2^2>2I^2$ is satisfied. Average optical output power of the optical modulator is larger than that obtained before the application of rotation.

The application of periodic or repeated rotation to the phase or polarization state of an optical output signal make it possible to appropriately determine whether the input-output characteristic of the analog part is in the linear range only by monitoring the fluctuation in the average optical output power of the optical modulator. Unlike the case where a low-frequency monitor signal is superimposed on the driving signal of an optical modulator, the influence on the quality of an optical output signal can be suppressed. In a case where optical output power fluctuates in a rotation dither cycle and is determined to have entered the nonlinear region, the input-output characteristic of the analog part can be kept in the linear range by reducing the output of the DAC and/or the gain of the driving circuit. Even if a rotation dither component is not included in optical output power, the influences of, for example, age deterioration and the changes in temperature and power supply voltage can be suppressed by adjusting the output of a DAC and/or the gain of a driving circuit to the maximum linear range.

Figure 5:
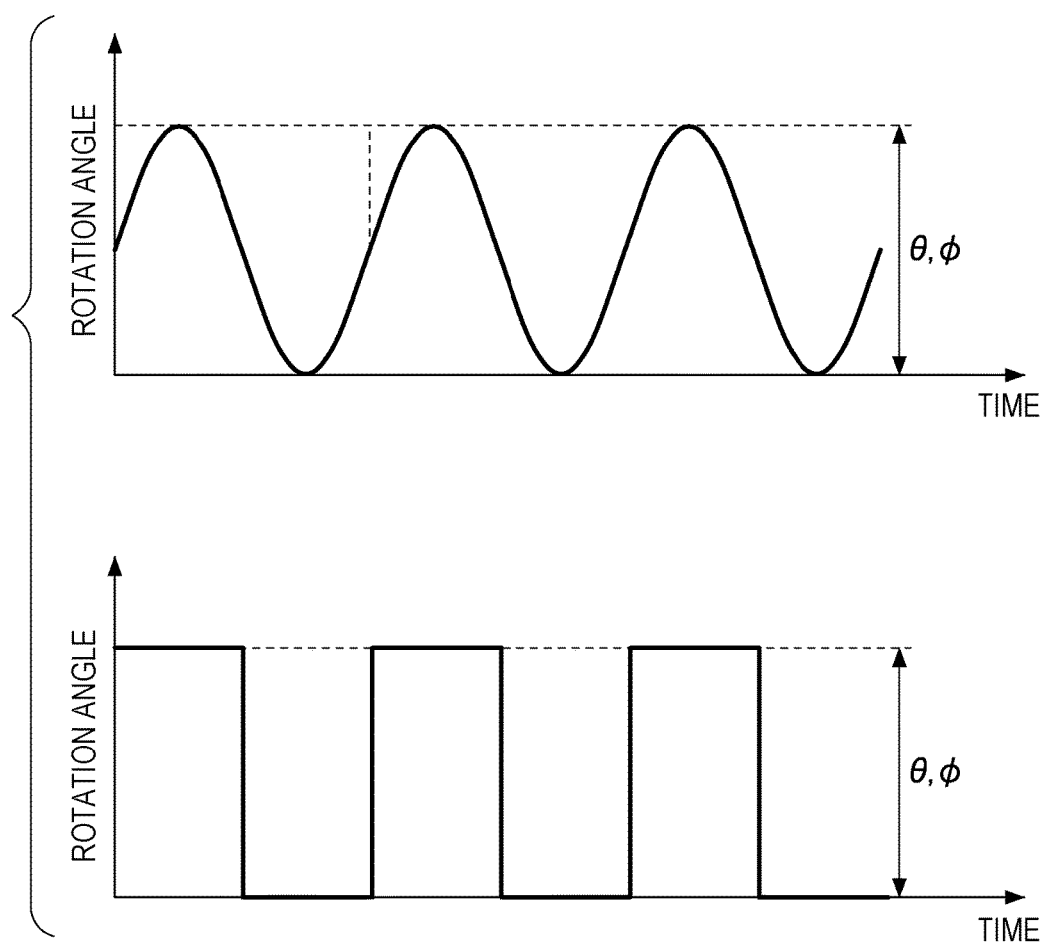
FIG. 5 is a diagram illustrating exemplary waveforms of rotation dithers.

FIG. 5 is a diagram illustrating exemplary waveforms of rotation dithers. A horizontal axis represents a time and a vertical axis represents a rotation angle. The upper drawing in FIG. 5 illustrates an exemplary case where a sinusoidal wave is used as a rotation dither. The lower drawing in FIG. 5 illustrates an exemplary case where a rectangular pulse is used as a rotation dither. In these drawings, θ represents the rotation angle of periodic or repeated rotation applied to the polarization state of an optical output signal and φ represents the rotation angle of periodic or repeated rotation applied to the phase of an optical output signal. The control of linearity using the rotation of a polarization state is applicable to a polarization multiplex modulation method such as dual polarization quadrature phase shift keying (DPQPSK). The control of linearity using the rotation of a phase is applicable to a single-polarization modulation method.

As described with reference to FIG. 4, in a case where the input-output characteristic of the part from the output of a DAC to the output amplitude of an optical modulator is brought into the nonlinear range, the fluctuation in power having the same frequency component as the rotation speed of a rotation dither is observed in the output light of the optical modulator. Accordingly, by monitoring the alternating-current (AC) component of the average optical output power of the optical modulator, it can be determined whether the input-output characteristic of the part from the output of a DAC to the output amplitude of an optical modulator is in the linear range and the influence of nonlinearity on optical transmission can be suppressed.

A DSP sets the speed of periodic rotation applied to the phase or polarization state, and can set the rotation speed at which the influence on an optical main signal becomes the minimum.

Figure 6:
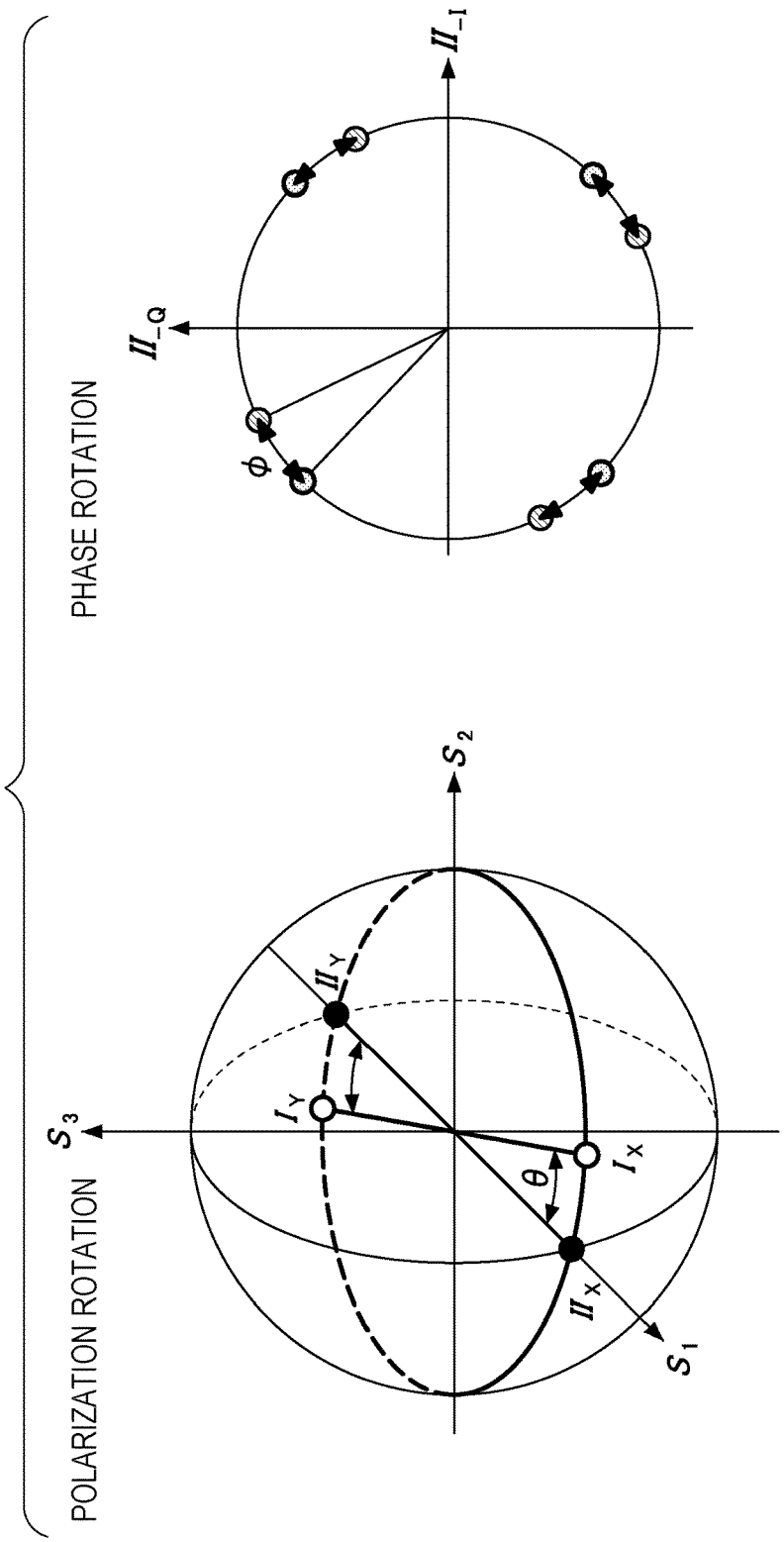
FIG. 6 is a diagram describing polarization rotation and phase rotation.

FIG. 6 is a diagram describing the rotation of a polarization state and the rotation of a phase. The drawing on the left side illustrates a polarization state on a Poincare sphere. Each point on the Poincare sphere (or on a unit radius) represents a unique polarization state. The equator represents linear polarization. The north pole and the south pole represent circular polarization. The Northern Hemisphere represents the state of right-handed elliptic polarization, and the Southern Hemisphere represents the state of left-handed elliptic polarization.

In the drawing, $I_X$ represents an X polarization channel main signal that is not subjected to rotation control and $II_X$ represents the state of X polarization after the rotation at a polarization rotation angle θ. $I_Y$ represents a Y polarization channel main signal that is not subjected to rotation control, and $II_Y$ represents the state of Y polarization after the rotation at the rotation angle θ. Even if a rotation dither at the angle θ is applied to a polarization state, a fluctuation component corresponding to a rotation cycle does not appear in monitored average optical output power when the input-output characteristic of the part from the output of a DAC to the output amplitude of an optical modulator is in the linear range. When an alternating-current (AC) component whose cycle is the same as a rotation cycle is detected in monitored optical output power, this means that an input-output characteristic has been brought into the nonlinear range. Based on a direction in which average optical output power fluctuates, it can be determined which of the super linear range and the saturated nonlinear range the input-output characteristic has entered. In both of these cases, the output of a DAC and/or the gain of a driving circuit are reduced until the AC component does not appear.

The drawing on the right side of FIG. 6 illustrates a constellation on an I-Q plane when the application of a rotation dither is performed. The phase of each of symbols assigned to signal points on the I-Q plane periodically rotates at the angle φ. Even if periodic or repeated rotation at the angle θ is applied to the phase of an optical output signal, a fluctuation component corresponding to a rotation cycle does not appear in monitored average optical output power as long as the input-output characteristic of the part from the output of a DAC to the output amplitude of an optical modulator is in the linear range. When an AC component whose cycle is the same as a rotation cycle is detected in monitored average optical output power, this means that the input-output characteristic has been brought into the nonlinear range. The output of a DAC and/or the gain of a driving circuit are reduced.

Figure 7:
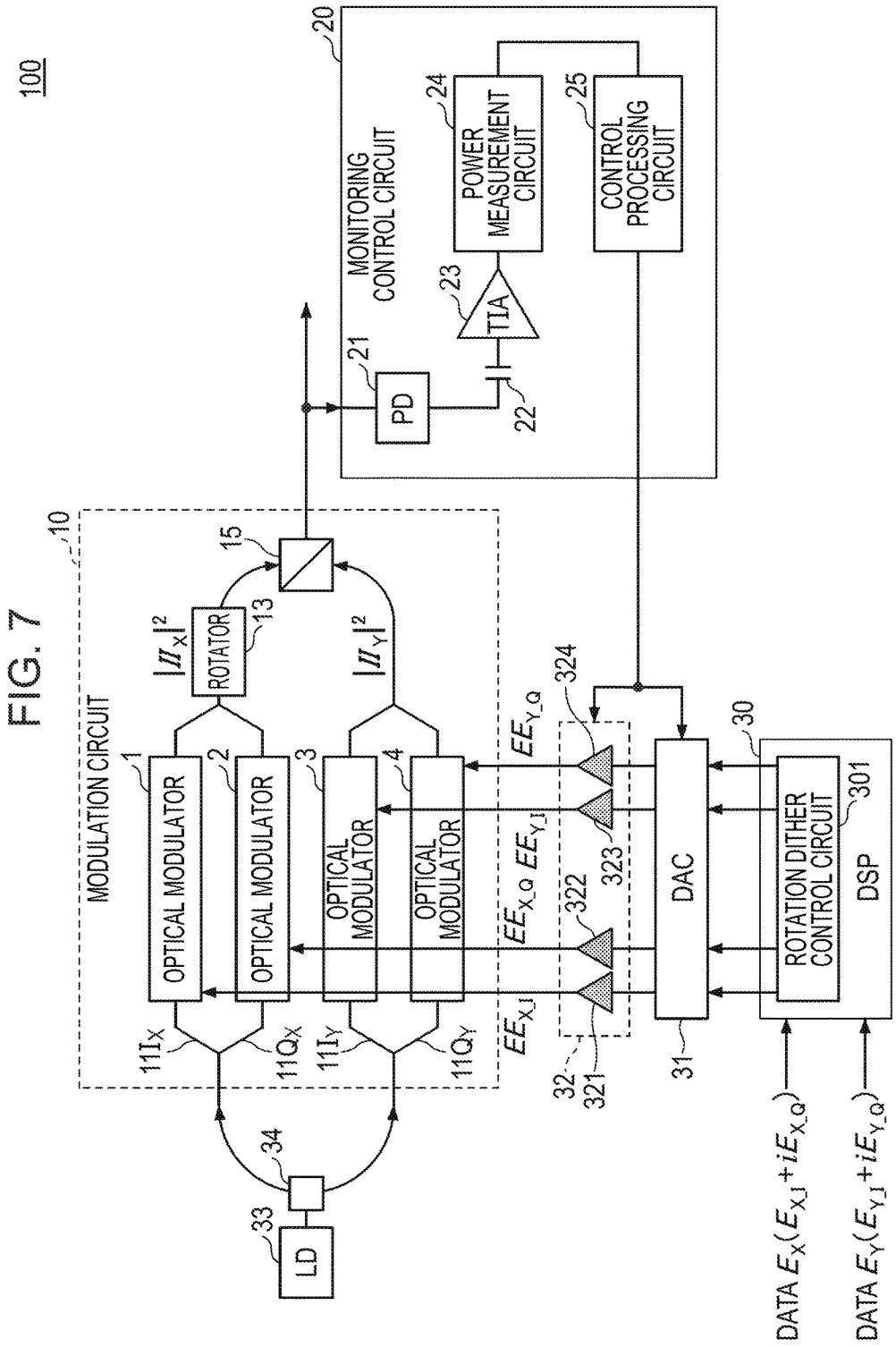
FIG. 7 is a schematic diagram of an optical transmitter according to an embodiment.

FIG. 7 is a schematic diagram of an optical transmitter 100 according to an embodiment. The optical transmitter 100 is used for, for example, optical communication employing a polarization multiplex modulation method. The optical transmitter 100 includes a DSP 30, a DAC 31, a driving circuit 32, a light source 33, a modulation circuit 10, and a monitoring control circuit 20. The DSP 30 includes a rotation dither control circuit 301.

The light source 33 is, for example, a laser diode (LD), and outputs continuous light. Light output from the light source 33 is separated by a branch circuit 34 such as a 3 dB coupler and inputs into the modulation circuit 10.

The modulation circuit 10 includes an X-channel I (in-phase)-branch optical modulator 1, an X-channel Q (quadrature)-branch optical modulator 2, a Y-channel I-branch optical modulator 3, and a Y-channel Q-branch optical modulator 4. Each of the optical modulators 1 to 4 may be a Mach-Zehnder (MZ) interferometer modulator including a pair of optical waveguides.

X-channel light is separated into two by optical waveguides $11I_X$ and $11Q_X$, and is input into the optical modulators 1 and 2. A Y polarized wave is separated into two by optical waveguides $11I_Y$ and $11Q_Y$, and is input into the optical modulators 3 and 4.

On the other hand, pieces of data $E_X$ and $E_Y$ that are electric signals to be transmitted are input into the DSP 30. The pieces of data $E_X$ and $E_Y$ are represented by Equation (1).

$$E_X = E_{X\_I} + iE_{X\_Q}$$

$$E_Y = E_{Y\_I} + iE_{Y\_Q} \quad (1)$$

The pieces of data $E_X$ and $E_Y$ input into the DSP 30 are mapped on the I-Q plane, are subjected to I-component pre-equalization and Q-component pre-equalization, and are input into the rotation dither control circuit 301.

The rotation dither control circuit 301 performs processing for periodically or repeatedly rotating the polarization state or phase of each signal component of an optical output signal. A signal output from the rotation dither control circuit 301 is input into the DAC 31.

The DAC 31 converts each signal component that has been subjected to rotation control into an analog signal and supplies the analog signal to corresponding one of amplifiers 321, 322, 323, and 324 in the driving circuit 32. An electric signal output from the DAC 31 is binarized in accordance with the amplitude and rotation speed of a rotation dither as illustrated in FIG. 4.

The amplifier 321 amplifies an input analog signal, generates a driving signal $EE_{X\_I}$ for the optical modulator 1, and outputs the generated driving signal. The amplifier 322 amplifies an input analog signal, generates a driving signal $EE_{X\_Q}$ for the optical modulator 2, and outputs the generated driving signal. The amplifier 323 amplifies an input analog signal, generates a driving signal $EE_{Y\_I}$ for the optical modulator 3, and outputs the generated driving signal. The amplifier 324 amplifies an input analog signal, generates a driving signal $EE_{Y\_Q}$ for the optical modulator 4, and outputs the generated driving signal.

The optical modulator 1 modulates an X polarized wave propagating through the optical waveguide $11I_X$ using the driving signal $EE_{X\_I}$, and outputs a result of the modulation. The optical modulator 2 modulates an X polarized wave propagating through the optical waveguide $11Q_X$ using the driving signal $EE_{X\_Q}$, and outputs a result of the modulation. The optical modulator 3 modulates a Y polarized wave propagating through the optical waveguide $11I_Y$ using the driving signal $EE_{Y\_I}$, and outputs a result of the modulation. The optical modulator 4 modulates a Y polarized wave propagating through the optical waveguide $11Q_Y$ using the driving signal $EE_{Y\_Q}$, and outputs a result of the modulation.

Light output from the optical modulator 1 and light output from the optical modulator 2 are coupled, and resultant light is subjected polarization rotation in the rotator 13 to be orthogonal to a Y-channel lightwave. The output of the rotator 13 is an X polarization signal including a polarization rotation dither and is represented by $|II_X|^2$. Light output from the optical modulator 3 and light output from the optical modulator 4 are coupled. Resultant light is a Y polarization signal including a polarization rotation dither and is represented by $|II_Y|^2$. The X polarization signal $|II_X|^2$ and the Y polarization signal $|II_Y|^2$ are coupled by a polarization beam combiner (PBC) 15, and a resultant signal is output as a modulated optical signal.

The monitoring control circuit 20 separates a part of the modulated optical signal to monitor average optical output power. The monitoring control circuit 20 includes a photodiode (PD) 21 that is a light-receiving element, a filter 22, a transimpedance amplifier (TIA) 23, a power measurement device 24, and a control processing circuit 25.

The PD 21 receives a part of the modulated optical signal and outputs a photocurrent corresponding to incident light. The filter 22 is, for example, a capacitor and removes the direct-current component of the photocurrent. The TIA 23 amplifies the AC component of the photocurrent and converts the photocurrent into a voltage signal. The power measurement device 24 measures the average power of the voltage signal. The control processing circuit 25 adjusts the output of the DAC 31 and/or the gain of the driving circuit 32 based on a measurement result of average power. As a result, the input-output characteristic of the part from the output of the DAC 31 to the optical output amplitude of the modulation circuit 10 is maintained in the linear range.

For example, when the monitored optical output power fluctuates at the same frequency as that of a rotation dither, this means that the output of a DAC has skipped the linear range and entered the nonlinear range. In this case, at least one of the output of the DAC and the gain of the driving circuit is reduced. Even if a fluctuation (AC) component whose frequency is the same as that of the rotation dither is not included in the optical output power, the output of the DAC and/or the gain of the driving circuit sometimes decrease because of, for example, age deterioration. In this case, it is desirable that the output of the DAC be controlled to be the maximum in a range where an AC component does not appear.

Figure 8A:
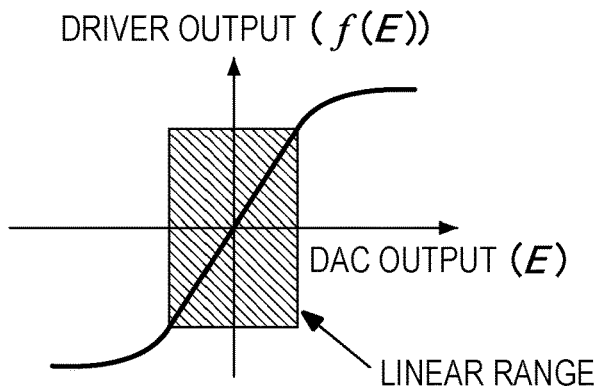
FIGS. 8A to 8C are diagrams illustrating the input-output characteristic of the analog part of an optical transmitter.
Figure 8B:
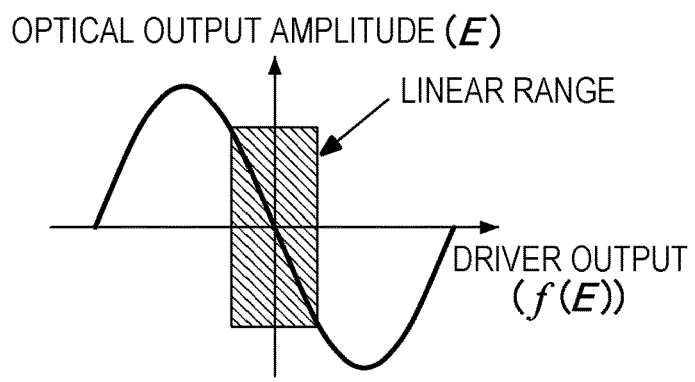
Figure 8C:
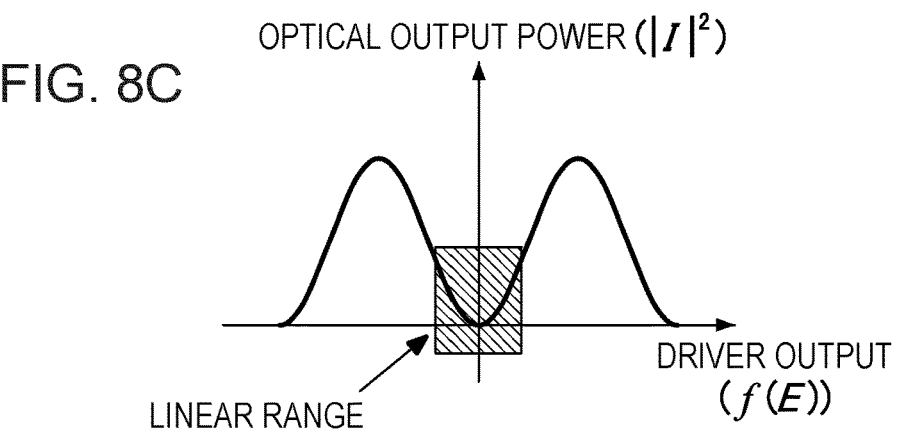

FIGS. 8A to 8C are diagrams illustrating the input-output characteristic of the optical transmitter 100. FIG. 8A illustrates the relationship between the output (E) of the DAC 31 and the output (f(E)) of the driving circuit 32, and, more accurately, the relationship between the output of a single lane of the DAC 31 and the output of a corresponding one of the amplifiers in the driving circuit 32. Even if the output of the DAC 31 is increased, the output of the driving circuit is saturated after the output of the DAC 31 has exceeded a certain value and linearity is not maintained. It is therefore desired that each output of the DAC 31 be controlled to be a value with which the corresponding output of the driving circuit 32 has the maximum linearity.

FIG. 8B illustrates the relationship between the output (f(E)) of the driving circuit 32 and the optical output amplitude (E). The linearity of the optical output amplitude is maintained in a certain range with its center at the origin of the output of the driving circuit. When the output of the driving circuit becomes too large, the optical output amplitude is brought into the nonlinear range and the waveform of an optical signal suffers distortion. Accordingly, it is desirable that the gain of each of the amplifiers 321 to 324 in the driving circuit 32 be set to a value with which the optical output amplitude of a corresponding one of the optical modulators 1 to 4 becomes the maximum value in the linear range.

FIG. 8C illustrates the relationship between the output of the driving circuit 32 and optical output power ($|II|^2$). The optical output power is proportional to the square of an amplitude. The optimization of the output of the driving circuit 32 can maximize optical output power in the linear range.

With the configuration illustrated in FIG. 7, unlike a case where a method of superimposing a monitor signal on an optical signal is employed, the influence on the quality of an optical output signal can be suppressed and the linearity of the input-output characteristic of the part from the output of a DAC to the output amplitude of an optical modulator can be accurately maintained with such a simple configuration.

<Polarization Rotation Control>

Figure 9:
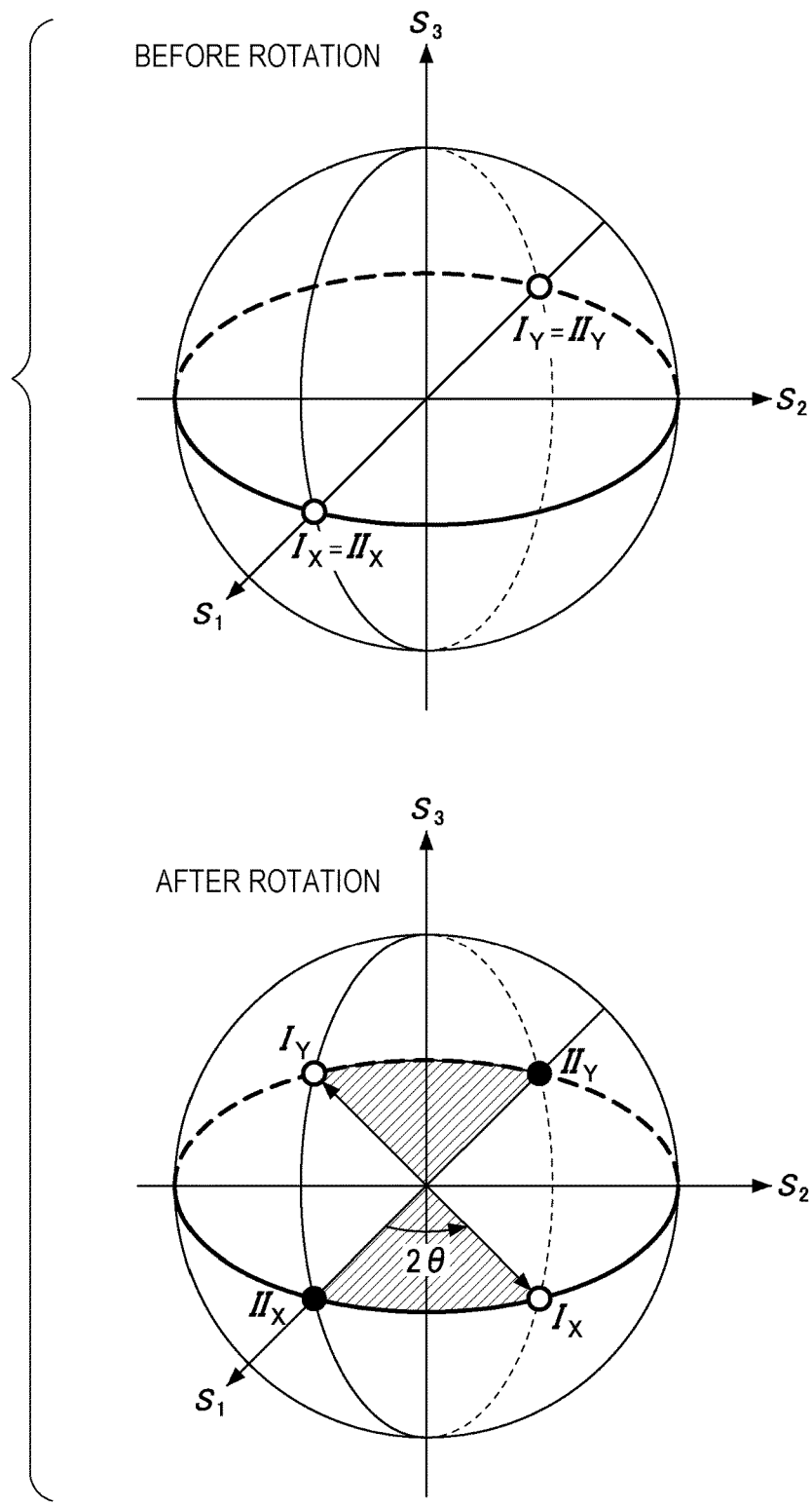
FIG. 9 is a diagram describing polarization rotation control.
Figure 10:
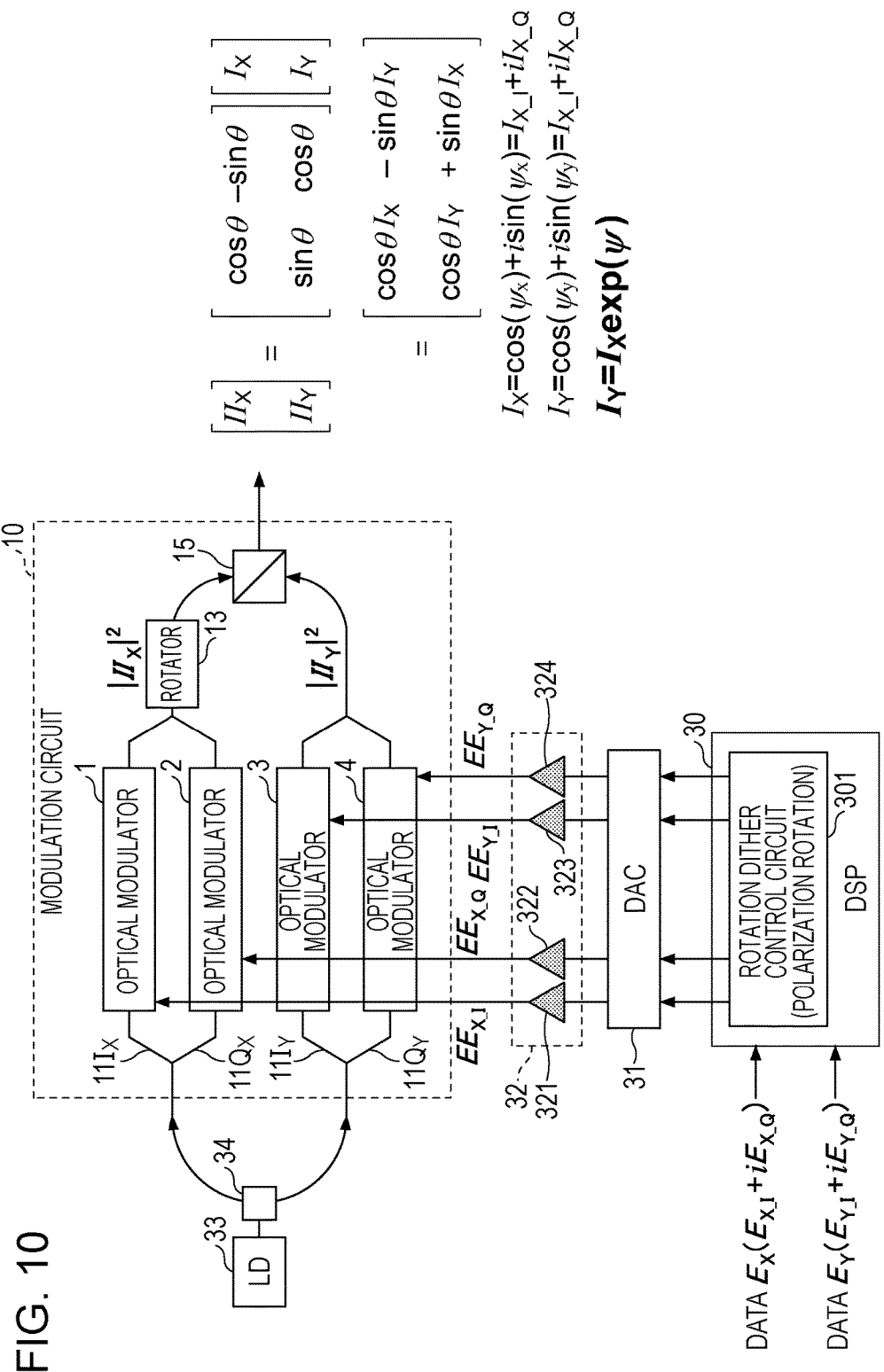
FIG. 10 is a diagram describing polarization rotation control.

FIGS. 9 and 10 are diagrams describing polarization rotation control for maintaining the linearity of the input-output characteristic of the part from the output of the DAC 31 to the output amplitude of the modulation circuit 10 (analog part). An X polarization channel optical main signal is represented by $I_X$, and Y polarization channel optical main signal is represented by $I_Y$. In a state in which the application of a rotation dither is not performed, an output $II_X$ of an X polarization channel modulator and an output $II_Y$ of a Y polarization channel modulator are respectively the same as the main signals $I_X$ and $I_Y$.

When the repeated rotation of a polarization state at the angle $\theta$ is set under the control of the DSP 30, the output $II_X$ of the X polarization channel modulator rotates from the polarization state of the X polarization channel optical main signal $I_X$ by $2\theta$ on the Poincare sphere illustrated in FIG. 9. The output $II_Y$ of the Y polarization channel modulator similarly rotates from the polarization state of the Y polarization channel optical main signal $I_Y$ by $2\theta$. The reason for this is that the orientations of X polarization and Y polarization actually differ by 90° but the difference between them is expressed by a $\pi$ radian on the Poincare sphere.

The rotation of a polarization state at the rotation angle $\theta$ can be realized by digital signal processing illustrated in FIG. 10. Referring to FIG. 10, the relationship between the X polarization optical main signal $I_X$ and the Y polarization optical main signal $I_Y$, which are obtained before rotation, and the X polarization optical output signal $II_X$ and the Y polarization optical output signal $II_Y$, which are obtained after rotation (are output from optical modulators), is represented by Equation (2).

$$\begin{bmatrix} II_X \\ II_Y \end{bmatrix} = \begin{bmatrix} \cos\theta & -\sin\theta \\ \sin\theta & \cos\theta \end{bmatrix} \begin{bmatrix} I_X \\ I_Y \end{bmatrix} \quad (2)$$

$$= \begin{bmatrix} \cos\theta I_X & -\sin\theta I_Y \\ \cos\theta I_Y & +\sin\theta I_X \end{bmatrix}$$

Equation (3) is derived from Equation (2).

$$I_X = \cos(\psi_x) + i\sin(\psi_x) = I_{X\_I} + iI_{X\_Q}$$

$$I_Y = \cos(\psi_y) + i\sin(\psi_y) = I_{Y\_I} + iI_{Y\_Q} \quad (3)$$

From Equation (3), $I_Y = I_X \cdot \exp(\psi)$ is derived. In these equations, $\psi$ represents the phase difference between Y polarization and X polarization. In the case of a QPSK signal, $\psi = \psi_y - \psi_x = n \times \pi/2$ (n=0, 1, 2, 3) is satisfied.

$E_X$, $E_Y$, $EE_X$, and $EE_Y$ respectively represent the electric signals of $I_X$, $I_Y$, $II_X$, and $II_Y$. The rotation dither control circuit 301 in the DSP 30 performs processing represented by Equation (4).

$$\begin{bmatrix} EE_X \\ EE_Y \end{bmatrix} = \begin{bmatrix} \cos\theta & -\sin\theta \\ \sin\theta & \cos\theta \end{bmatrix} \begin{bmatrix} E_X \\ E_Y \end{bmatrix} \quad (4)$$

$$= \begin{bmatrix} \cos\theta E_X & -\sin\theta E_Y \\ \cos\theta E_Y & +\sin\theta E_X \end{bmatrix}$$

As a result, the rotation dither control circuit 301 can rotate the polarization state at the rotation angle θ.

Figure 11B:
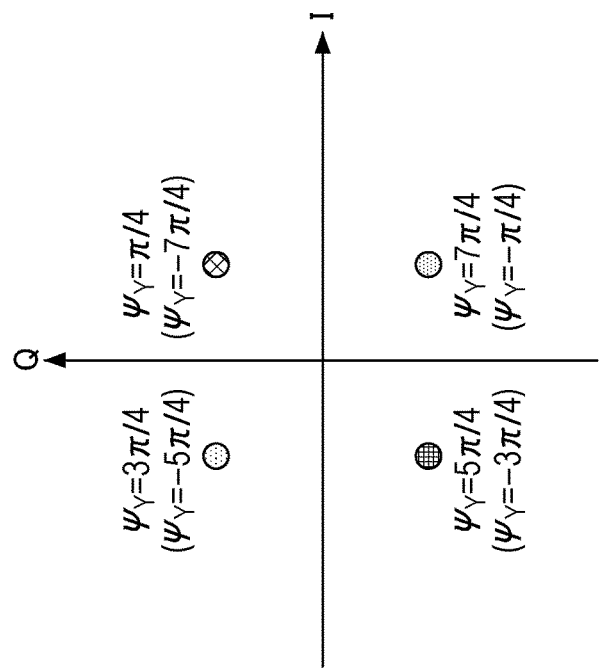
FIG. 11A is a diagram illustrating the pattern data of an X polarization main signal and FIG. 11B is a diagram illustrating the pattern data of a Y polarization main signal.
Figure 11A:
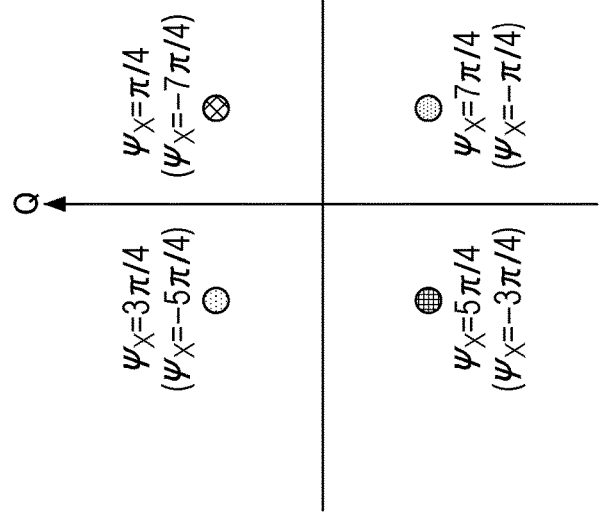
Figure 12A:
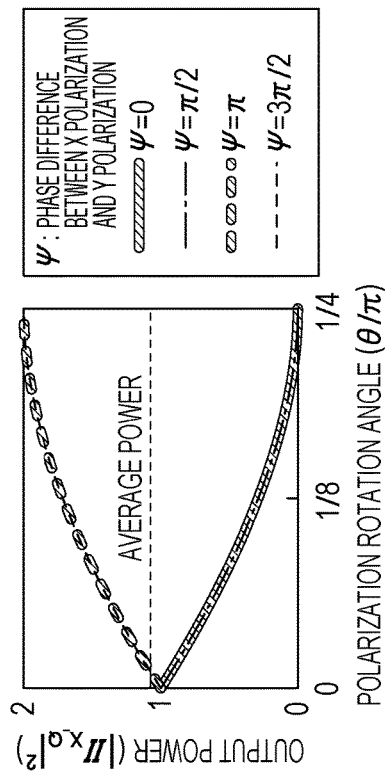
FIGS. 12A to 12D are diagrams illustrating the relationship between a polarization rotation angle and the output power of an optical modulator.
Figure 12C:
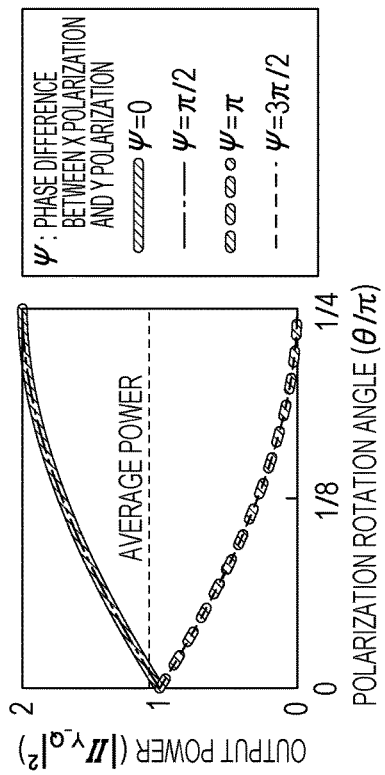
Figure 12B:
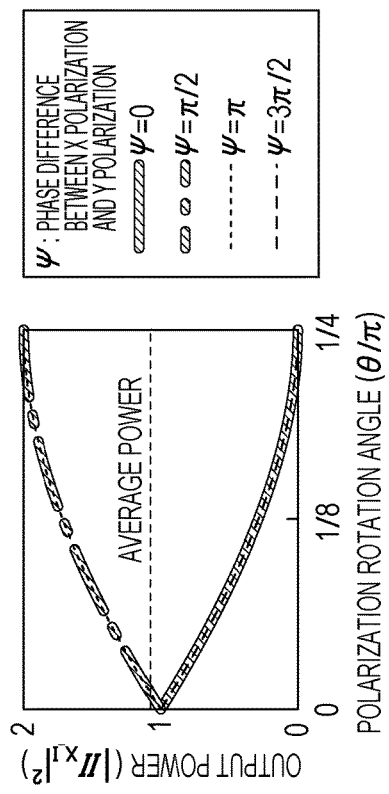
Figure 12D:
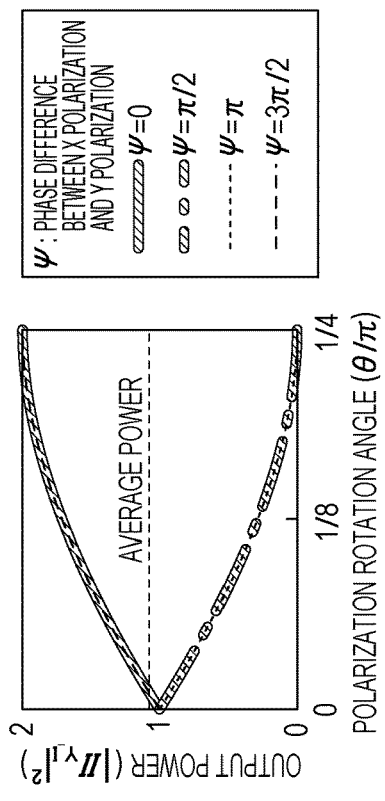

FIG. 11A is a diagram illustrating the pattern data of an X polarization main signal and FIG. 11B is a diagram illustrating the pattern data of a Y polarization main signal. Descriptions will be made by taking a QPSK modulation method as an example. In each of X polarization and Y polarization, four symbols are mapped on the I-Q plane. Counterclockwise, the phases of respective signal points are π/4, 3π/4, 5π/4, and 7π/4. As represented in parentheses in the drawings, phases may be expressed in a clockwise direction.

FIGS. 12A to 12D are diagrams illustrating the relationship between the rotation angle of a polarization state and the output power of an optical modulator. The phase difference $\psi$ between X polarization and Y polarization is determined based on a data pattern. The output power of the optical modulators 1 to 4 fluctuates depending on the pattern data of an X polarization channel main signal and the pattern data of a Y polarization channel main signal, that is, the phase difference $\psi$ between polarizations. However, average output power does not fluctuate depending on a rotation angle.

In the optical modulator 1, when the phase difference $\psi$ between polarizations is π/2 and π, the increase in a polarization rotation angle increases optical output power. When the phase difference $\psi$ between polarizations is 0 (zero) and 3π/2, the increase in a polarization rotation angle decreases optical output power. However, average power is invariable regardless of a polarization rotation angle as long as the optical modulator operates in the linear range.

In the optical modulator 2, when the phase difference $\psi$ between polarizations is π and 3π/2, the increase in a polarization rotation angle increases optical output power. When the phase difference $\psi$ between polarizations is zero and π/2, the increase in a polarization rotation angle decreases optical output power. However, average power does not fluctuate even if a polarization rotation angle fluctuates.

In the optical modulator 3, when the phase difference $\psi$ between polarizations is zero and 3π/2, the increase in a polarization rotation angle increases optical output power. When the phase difference $\psi$ between polarizations is π/2 and π, the increase in a polarization rotation angle decreases optical output power. However, average power does not fluctuate even if a polarization rotation angle fluctuates.

In the optical modulator 4, when the phase difference $\psi$ between polarizations is zero and π/2, the increase in a polarization rotation angle increases optical output power. When the phase difference $\psi$ between polarizations is π and 3π/2, the increase in a polarization rotation angle decreases optical output power. However, average optical output power does not fluctuate even if a polarization rotation angle fluctuates.

When the linearity of the input-output characteristic of the analog part of the optical transmitter 100 is controlled using periodic polarization rotation, an appropriate rotation angle with which the linearity is maintained is selected.

Figure 13C:
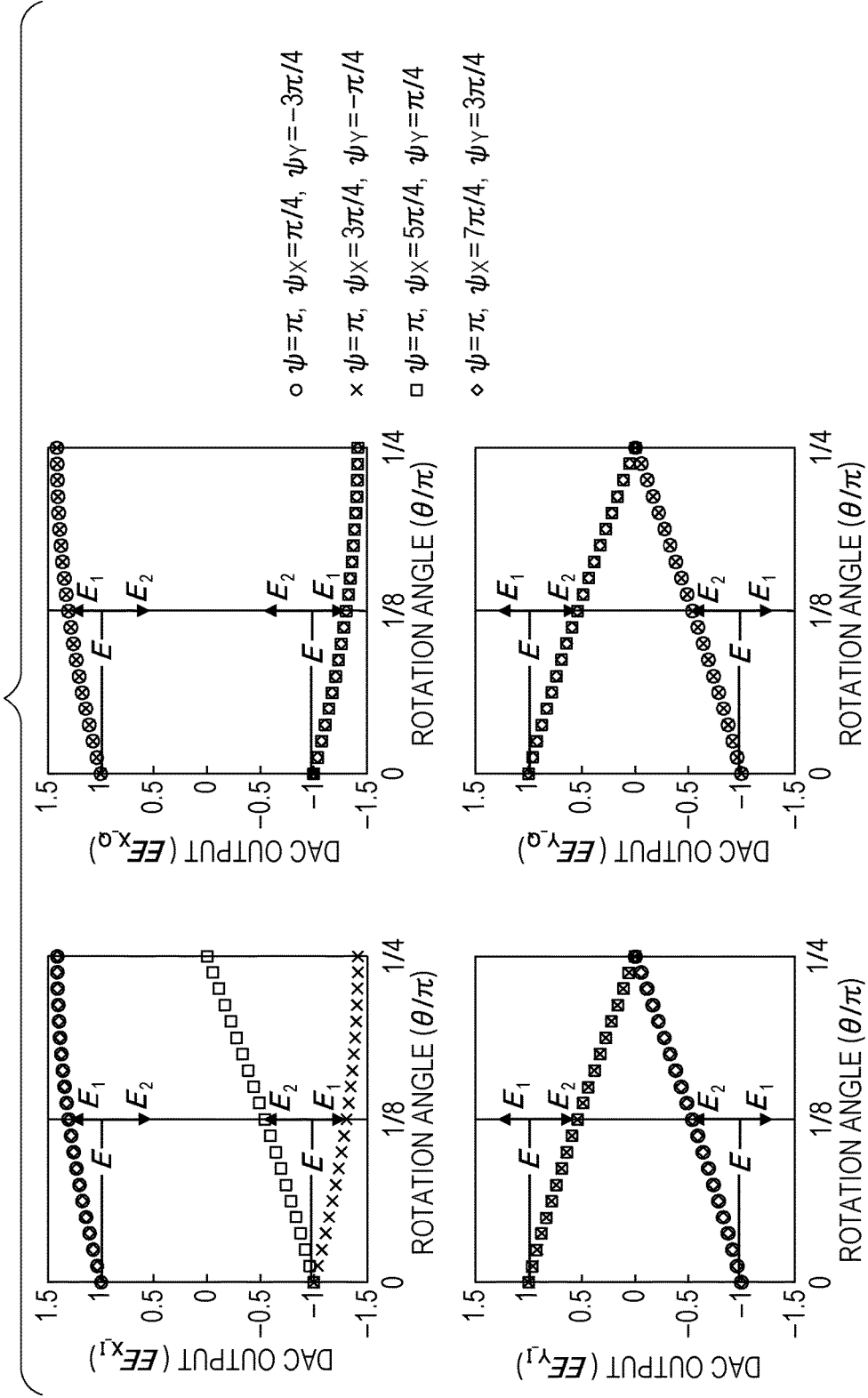
Figure 13D:
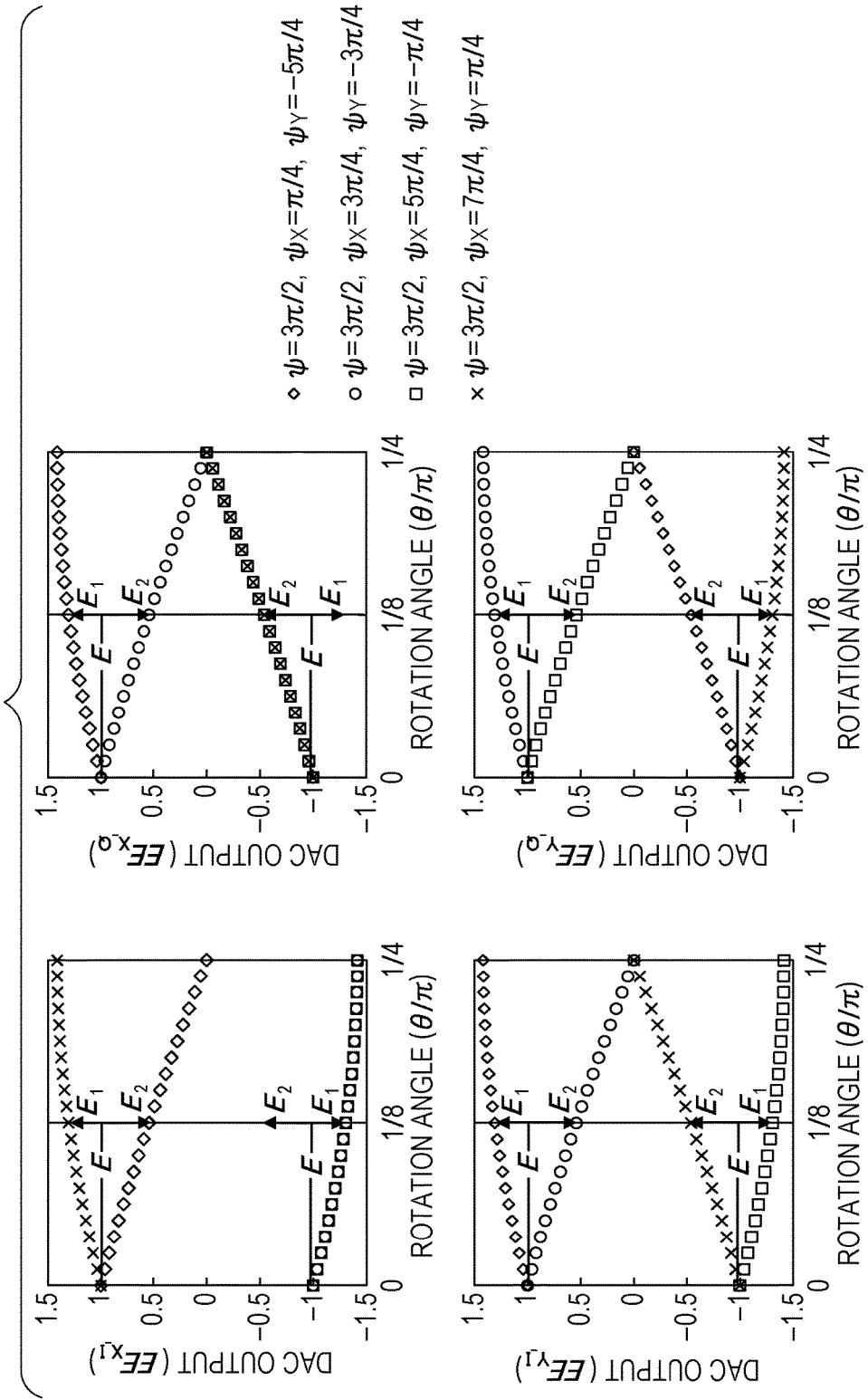

FIGS. 13A to 13D are diagrams illustrating a DAC output value binarized in accordance with a rotation angle. FIG. 13A illustrates in four cases of ($\psi$=0, $\psi_x$=π/4, $\psi_y$=π/4), ($\psi$=0, $\psi_x$=3π/4, $\psi_y$=3π/4)/($\psi$=0, $\psi_x$=5π/4, $\psi_y$=5π/4) and ($\psi$=0, $\psi_x$=7π/4, $\psi_y$=7π/4). FIG. 13B illustrates in four cases of ($\psi$=π/2, $\psi_x$=π/4, $\psi_y$=−π/4), ($\psi$=π/2, $\psi_x$=3π/4, $\psi_y$=π/4), ($\psi$=π/2, $\psi_x$=5π/4, $\psi_y$=3π/4) and ($\psi$=π/2, $\psi_x$=7π/4, $\psi_y$=5π/4). FIG. 13C illustrates in four cases of ($\psi$=π, $\psi_x$=π/4, $\psi_y$=−3π/4), ($\psi$=π, $\psi_x$=3π/4, $\psi_y$=−π/4), ($\psi$=π, $\psi_x$=5π/4, $\psi_y$=π/4) and ($\psi$=π, $\psi_x$=7π/4, $\psi_y$=3π/4). FIG. 13D illustrates in four cases of ($\psi$=3π/2, $\psi_x$=π/4, $\psi_y$=−5π/4), ($\psi$=3π/2, $\psi_x$=3π/4, $\psi_y$=−3π/4), ($\psi$=3π/2, $\psi_x$=5π/4, $\psi_y$=−π/4) and ($\psi$=3π/2, $\psi_x$=7π/4, $\psi_y$=π/4). $\psi$ represents the phase difference between Y polarization and X polarization. $\psi_x$ represents the X polarization phase. $\psi_y$ represents the Y polarization phase. Each drawing in the upper-left part of FIGS. 13A to 13D illustrates the dependence of a DAC output ($EE_{X\_I}$) for the optical modulator 1 on a rotation angle. Each drawing in the upper-right part of FIGS. 13A to 13D illustrates the dependence of a DAC output ($EE_{X\_Q}$) for the optical modulator 2 on a rotation angle. Each drawing in the lower-left part of FIGS. 13A to 13D illustrates the dependence of a DAC output ($EE_{Y\_I}$) for the optical modulator 3 on a rotation angle. Each drawing in the lower-right part of FIGS. 13A to 13D illustrates the dependence of a DAC output ($EE_{Y\_Q}$) for the optical modulator 4 on a rotation angle. When a certain rotation angle is set in the DSP 30, the phase difference $\psi$ between the pattern data of an X polarization channel main signal and the pattern data of a Y polarization channel main signal fluctuates. Even with the same rotation angle, the output of a DAC fluctuates depending on the phase difference $\psi$.

However, even if the phase difference $\psi$ fluctuates, the output of the DAC 31 is binarized into $E_1$ and $E_2$ with an output level E obtained at the time of no rotation for its center and the relationship of $E_1^2 + E_2^2 = E^2$ is established (see FIG. 4). Accordingly, the method of monitoring average optical output power using periodic polarization rotation set in the DSP 30 and determining the linearity of the input-output characteristic of an analog part can be effectively used.

<Phase Rotation Control>

Figure 14:
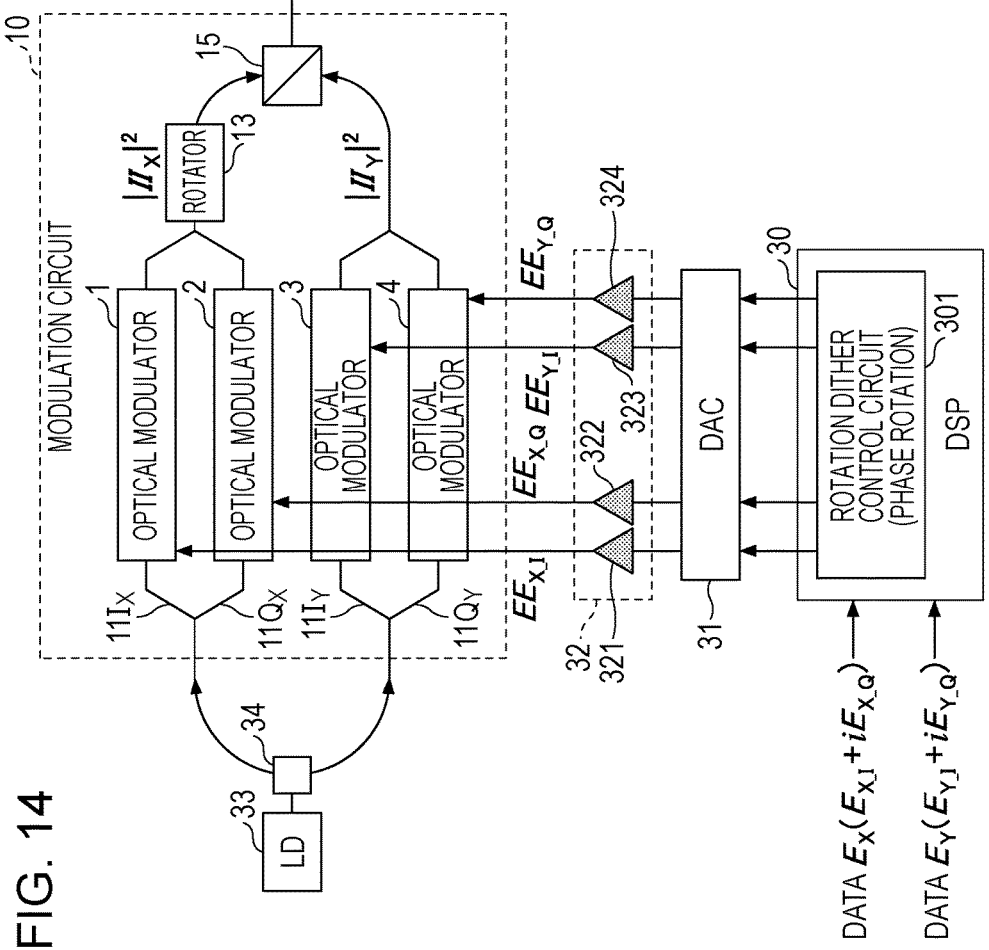
FIG. 14 is a diagram describing phase rotation control.
Figure 15:
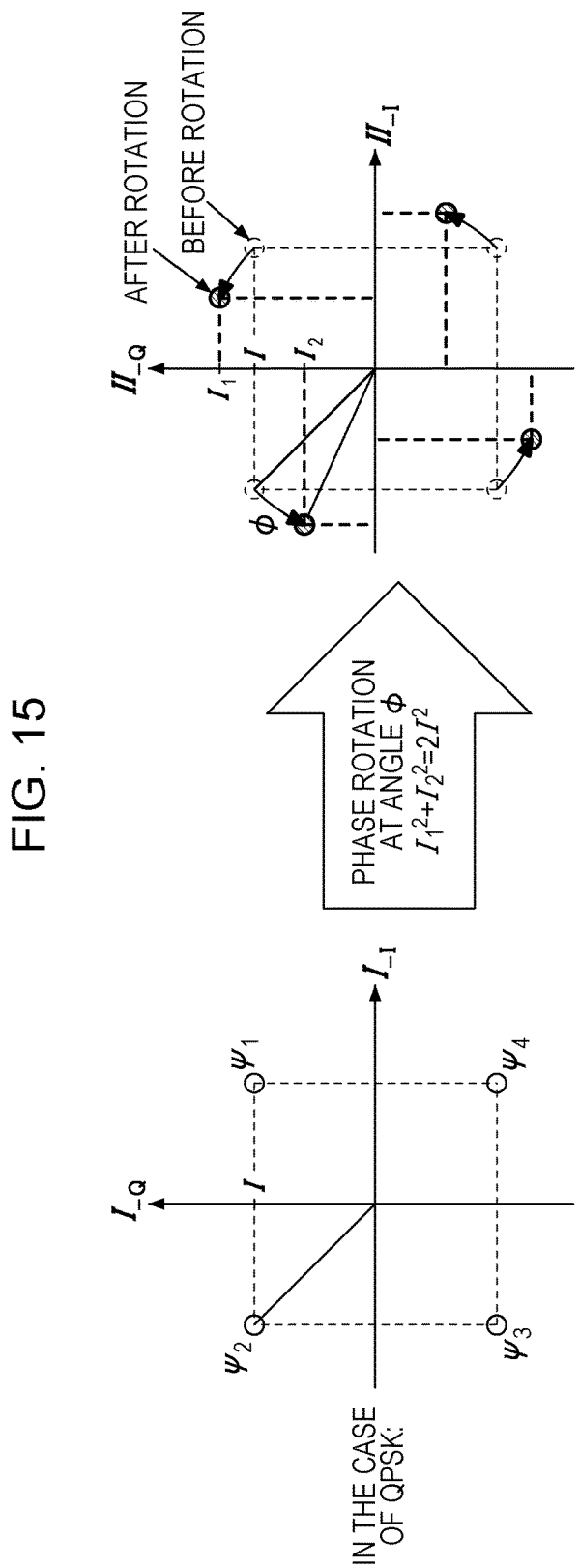
FIG. 15 is a diagram describing phase rotation control.
Figure 16A:
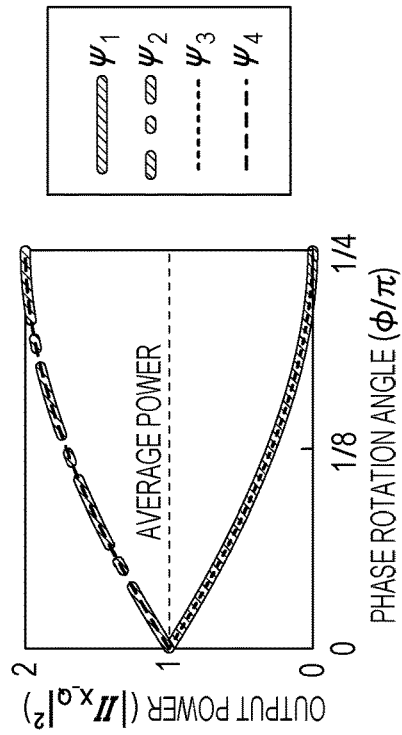
FIGS. 16A to 16D are diagrams illustrating the relationship between a polarization rotation angle and the output power of an optical modulator.
Figure 16B:
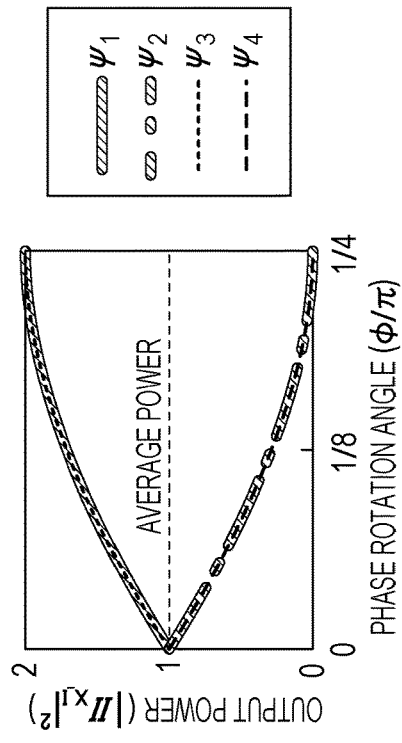
Figure 16C:
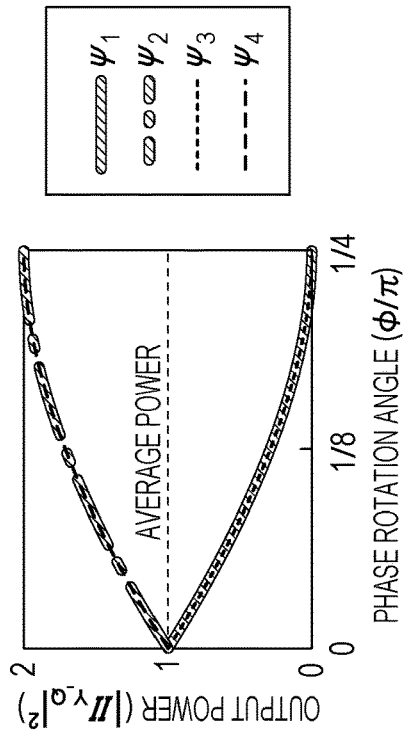
Figure 16D:
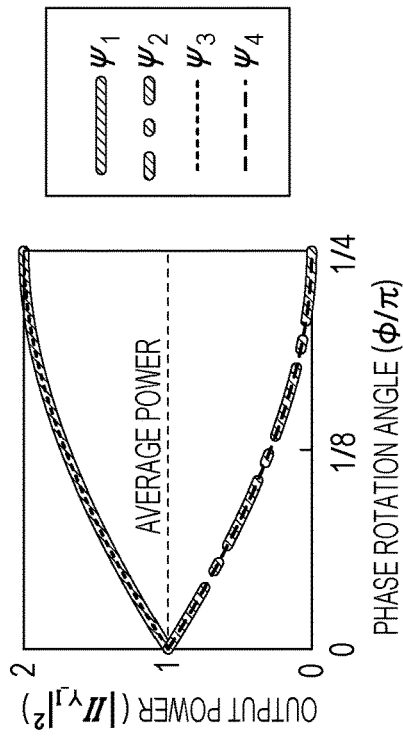

FIGS. 14 and 15 are diagrams describing phase rotation control at the time of determination of the linearity of the input-output characteristic of the analog part of the optical transmitter 100. Referring to FIG. 14, when the rotation dither control circuit 301 in the DSP 30 sets phase rotation at an angle φ for an input electric signal, the output of the DAC 31 is binarized like in the polarization rotation control. An analog signal whose output range has been enlarged by the binarization is amplified by the amplifiers 321 to 324 in the driving circuit 32, and driving signals $EE_{X\_I}$, $EE_{X\_Q}$, $EE_{Y\_I}$, and $EE_{Y\_Q}$ are respectively input into the optical modulators 1 to 4.

When the application of phase rotation is not performed, respective symbols are assigned to signal points on the I-Q plane as illustrated in the drawing on the left side of FIG. 15. In the case of QPSK, the phases of four symbols are $\psi_1$, $\psi_2$, $\psi_3$, and $\psi_4$. When the application of phase rotation at the angle $\phi$ is performed, the phase of each symbol rotates as illustrated in the drawing on the right side of FIG. 15 and the amplitude of the optical output of the modulation circuit 10 fluctuates. However, as long as the input-output characteristic of the analog part of the optical transmitter 100 is in the linear range, the relationship of $I_1^2 + I_2^2 = 2I^2$ is established and average optical output power does not fluctuate.

Referring back to 14, the relationship between the X polarization channel optical main signal $I_X$ and the Y polarization channel optical main signal $I_Y$, which are obtained before rotation, and the X polarization modulator output $II_X$ and the Y polarization modulator output $II_Y$, which are obtained after phase rotation, is represented by Equation (5).

$$\begin{bmatrix} II_X \\ II_Y \end{bmatrix} = \begin{bmatrix} I_X \exp(i\phi) \\ I_Y \exp(i\phi) \end{bmatrix} \quad (5)$$

In this equation, $\phi$ represents a phase rotation angle. Assuming that an X polarization phase is $\psi_x$ and a Y polarization phase is $\psi_y$, the optical main signals $I_X$ and $I_Y$ which are obtained before rotation and the modulator outputs $II_X$ and $II_Y$ which are obtained after phase rotation are represented by Equation (6).

$I_Y = \cos(\psi_y) + i\sin(\psi_y) = I_{Y\_I} + iI_{Y\_Q}$ $I_X = \cos(\psi_x) + i\sin(\psi_x) = I_{X\_I} + iI_{X\_Q}$ $II_Y = \cos(\psi_y + \phi) + i\sin(\psi_y + \phi) = II_{Y\_I} + iII_{Y\_Q}$ $II_X = \cos(\psi_x + \phi) + i\sin(\psi_x + \phi) = II_{X\_I} + iII_{X\_Q}$ \quad (6)

The rotation dither control circuit 301 in the DSP 30 performs the same processing on the input data signals $E_X$ and $E_Y$, so that the amplitude values of optical outputs of the I-branch optical modulators 1 and 3 and the Q-branch optical modulators 2 and 4 are binarized.

FIGS. 16A to 16D are diagrams illustrating the relationship between a polarization rotation angle and the optical output power of an optical modulator. The optical output powers of the optical modulators 1 to 4 fluctuate depending on a phase $\psi_n$ of each signal point. However, as long as the input-output characteristic is in the linear range, average optical output power does not fluctuate depending on a phase rotation angle.

In the optical modulators 1 and 3, when the phase of a symbol is $\psi_1$ and $\psi_3$, the increase in a polarization rotation angle increases optical output power. When the phase of a symbol is $\psi_2$ and $\psi_4$, the increase in a polarization rotation angle decreases optical output power. However, average optical output power is invariable in the linear range.

In the optical modulators 2 and 4, when the phase of a symbol is $\psi_2$ and $\psi_4$, the increase in a polarization rotation angle increases optical output power. When the phase of a symbol is $\psi_1$ and $\psi_3$, the increase in a polarization rotation angle decreases optical output power. However, average optical output power is invariable in the linear range.

When the linearity of the input-output characteristic of the analog part of the optical transmitter 100 is controlled using periodic phase rotation, average optical output power can be monitored and the determination of the linearity can be accurately performed by selecting the rotation angle $\phi$ in an appropriate range.

Figure 17:
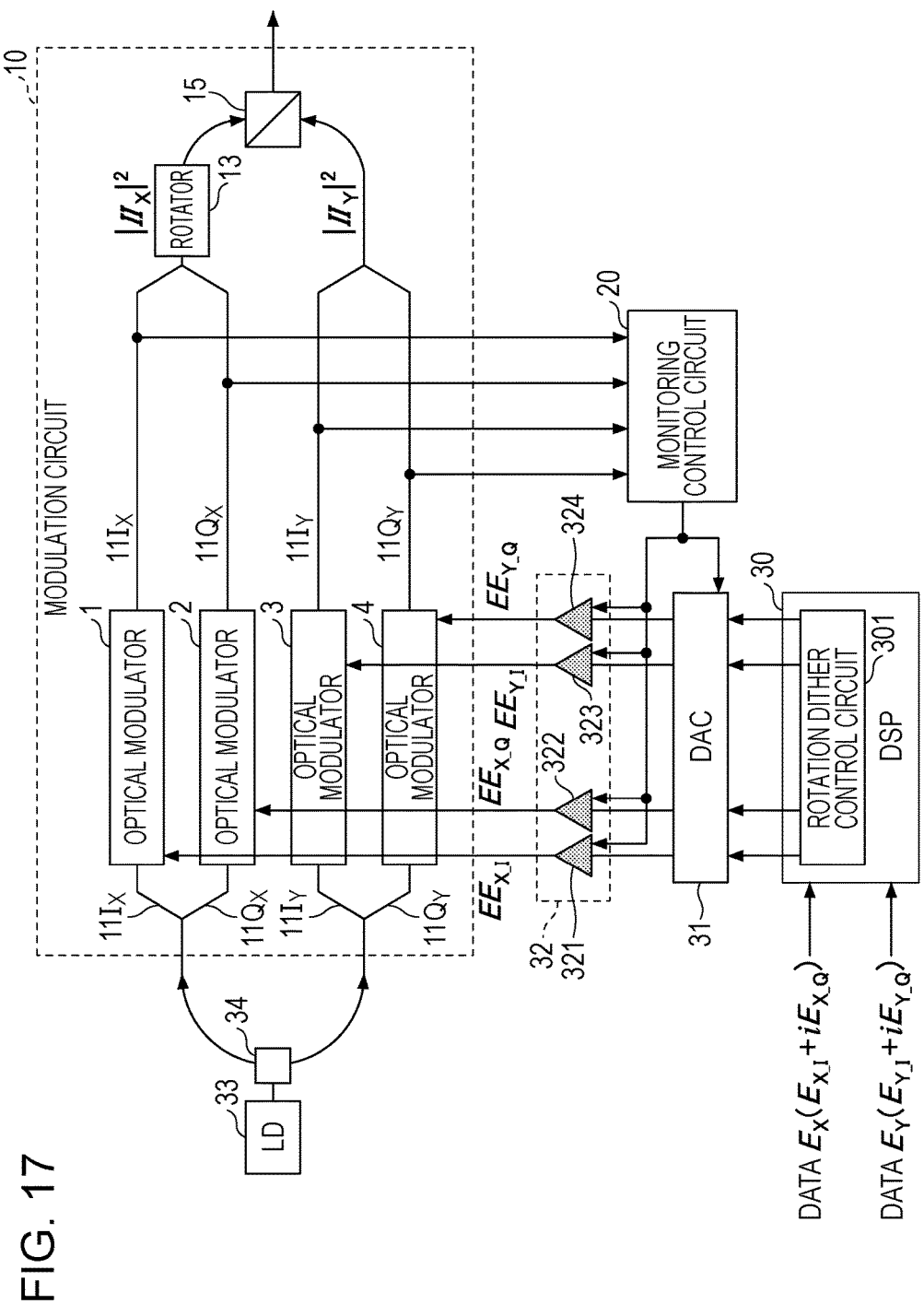
FIG. 17 is a diagram illustrating a modification of the optical transmitter illustrated in FIG. 7.

FIG. 17 is a diagram illustrating an optical transmitter 100A that is a modification of the optical transmitter 100 illustrated in FIG. 7. In the drawing, components the same as those in the optical transmitter 100 illustrated in FIG. 7 are given the same reference numerals, and the description thereof will not be repeated. In the optical transmitter 100A, optical outputs of the four optical modulators 1 to 4 are separated before being coupled and are input into the monitoring control circuit 20. The monitoring control circuit 20 may perform monitoring control upon the optical outputs of the optical modulators 1 to 4 in a time-division manner using a configuration the same as that of the monitoring control circuit 20 illustrated in FIG. 7. Alternatively, four monitoring control circuits 20 one-to-one corresponding to the optical modulators 1 to 4 may be provided.

The monitoring control circuit 20 individually controls the outputs of four lanes of the DAC 31 and the gains of the amplifiers 321 to 324 in the driving circuit 32 based on a result of monitoring. This increases the degree of control accuracy. Like in the configuration illustrated in FIG. 7, the periodic polarization rotation or periodic phase rotation of an optical output signal can be performed by the DSP 30. Even if the driving amplitudes of the optical modulators 1 to 4 are not modulated at a low frequency, the linearity of the input-output characteristic of the analog part of the optical transmitter 100A can be maintained and controlled.

Figure 18:
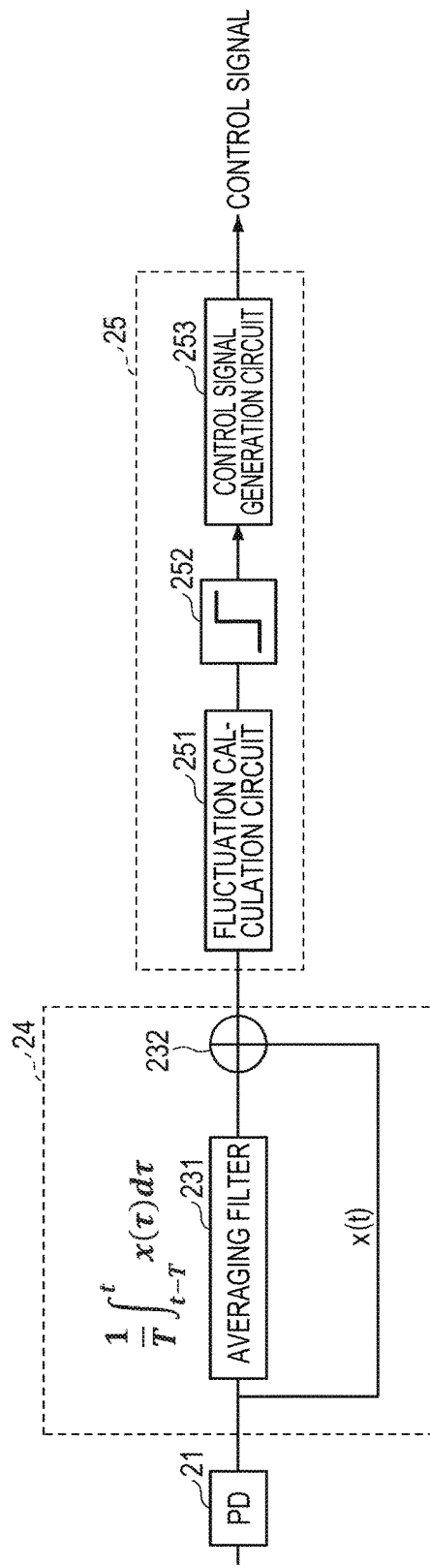
FIG. 18 is a diagram illustrating an exemplary configuration of a monitoring control circuit.

FIG. 18 is a diagram illustrating an exemplary configuration of the monitoring control circuit 20 in the optical transmitter 100 or 100A. In FIG. 18, the illustration of the filter 22 for removing a direct current and the TIA 23 for performing current-voltage conversion is omitted. As the filter 22 and the TIA 23, known circuit configurations may be employed.

The power measurement device 24 includes an averaging filter 231 and a subtracter 232. The averaging filter 231 calculates the average of fluctuations in optical output power per a time T that are caused by the fluctuation in polarization state rotation or phase rotation. The subtracter 232 calculates the difference between the average optical output power and optical output power x(t) that is not subjected to averaging. In a case where the input-output characteristic of the analog part of the optical transmitter 100 (or 100A) is in the linear range, there is no difference between optical output power and the average optical output power per the time T. In a case where the input-output characteristic is brought into the nonlinear region, an output waveform is distorted and a difference is generated between optical output power and the average optical output power.

The output of the power measurement device 24 is connected to the input of the control processing circuit 25. The control processing circuit 25 includes a fluctuation calculation unit 251, a determination circuit 252, and a control signal generation unit 253. The fluctuation calculation unit 251 calculates the amount of fluctuation based on the output of the subtracter 232 and outputs a result of the calculation to the determination circuit 252. The determination circuit 252 determines whether the amount of fluctuation exceeds a threshold value (allowable error or allowable fluctuation), and outputs a result of the determination to the control signal generation unit 253. This determination result may include a result of determination of whether optical output power after rotation is larger or smaller than optical output power before the rotation. An increasing fluctuation direction means that an input-output characteristic is in the super linear range illustrated in FIG. 4, and a decreasing fluctuation direction means that input-output characteristic is in the saturated nonlinear range illustrated in FIG. 4. In both cases where optical output power increases and decreases, an input-output characteristic is brought into the nonlinear range. The output of the DAC and/or the gain of the driving circuit are reduced. In a case where the amount of fluctuation is generated, the control signal generation unit 253 generates and outputs a control signal for reducing the output of the DAC and/or the gain of the driving circuit so as to bring the input-output characteristic of the analog part of the optical transmitter 100 (or 100A) back into the linear range. The control signal is supplied to the DAC 31 and the driving circuit 32.

Figure 19:
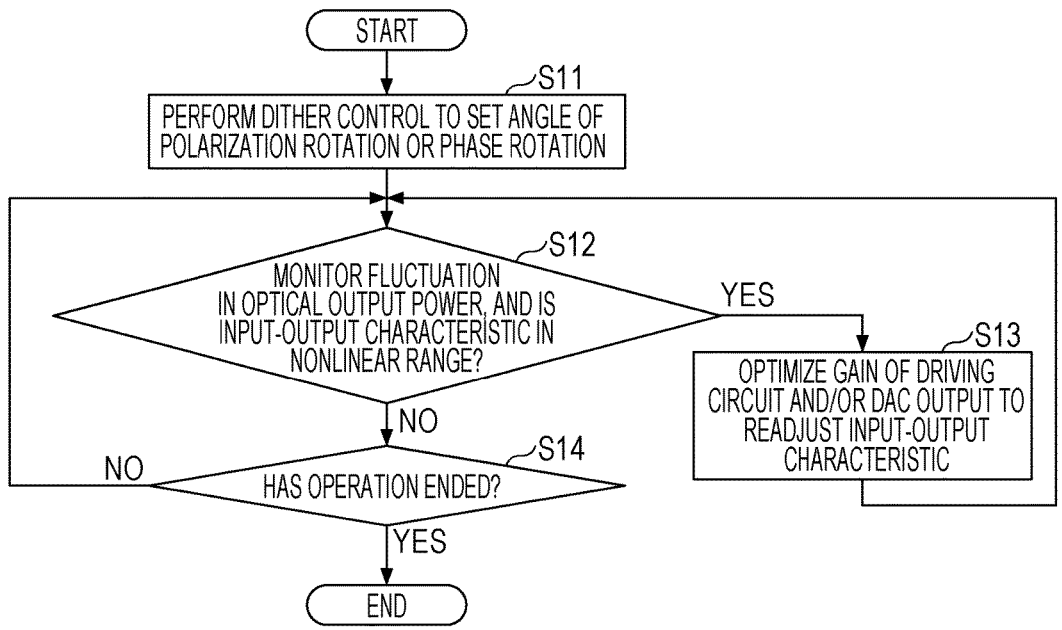
FIG. 19 is a flowchart illustrating the control operation of an optical transmitter.

FIG. 19 is a flowchart illustrating the control operation of the optical transmitter 100 (or 100A). The DSP 30 performs control processing for setting the polarization rotation angle θ or the phase rotation angle φ for an input electric signal (S11). The angle and speed of polarization rotation or phase rotation are set to minimize the influence on a main optical signal.

The monitoring control circuit 20 monitors the fluctuation in optical output power and determines whether the input-output characteristic of the analog part (from a DAC output to an optical output amplitude) of the optical transmitter 100 (or 100A) has been brought into the nonlinear range (S12). In a case where the input-output characteristic has been brought into the nonlinear range (YES in S12), at least one of the gain of the driving circuit 32 and the output of the DAC 31 is optimized for the adjustment of the input-output characteristic (S13). In a case where the input-output characteristic is in the linear range (NO in S12), the process from S12 to S14 is repeated as long as the optical transmitter is in operation (NO in S14).

Figure 20:
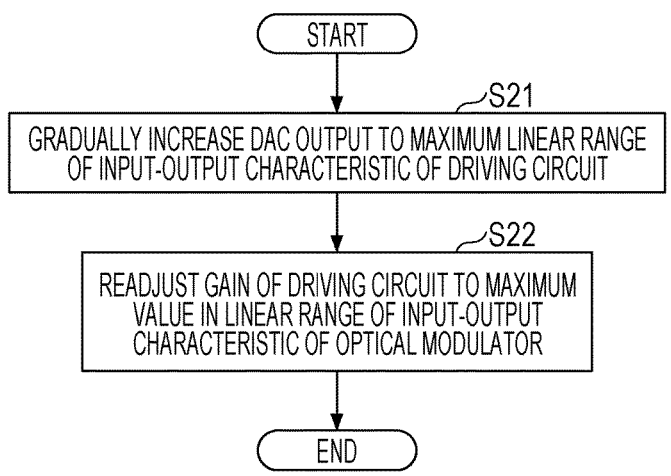
FIG. 20 is a flowchart illustrating an example of a process of optimizing the outputs of a DAC and a driving circuit.

FIG. 20 is a flowchart illustrating a process of optimizing the output of the DAC 31 and the gain of the driving circuit 32. Even if the input-output characteristic of the analog part of the optical transmitter 100 is in the linear range, the output of the DAC 31 and the gain of the driving circuit 32 can be adjusted in this process. For example, in a case where the output of the DAC 31 and the gain of the driving circuit 32 decrease because of, for example, age deterioration, the linear range of the input-output characteristic of the analog part is narrowed. In this case, by readjusting and optimizing the output of the DAC and the gain of the driving circuit, the use of the linear range can be maximized. This process may be performed at evenly spaced periods of time, such as monthly or semiannually or at irregular intervals.

First, the output of the DAC 31 is gradually increased to the maximum linear range of an input-output characteristic of the driving circuit 32 (S21). It can be determined whether the input-output characteristic of the driving circuit 32 is in the linear range by using the configuration of the monitoring control circuit 20 illustrated in FIG. 18. After the output of the DAC has been increased to the maximum linear range, the gains of the amplifiers 321 to 324 in the driving circuit 32 are respectively increased to the maximum values in the linear ranges of input-output characteristics of the optical modulators 1 to 4 (S22). With this process, even in a case where the output of the DAC 31 and/or the gain of the driving circuit 32 decrease because of age deterioration, they can be readjusted to optimum levels in the linear ranges of input-output characteristics.

FIG. 21 is a flowchart illustrating another process of optimizing the output of the DAC 31 and the gain of the driving circuit 32. The input-output characteristic of the analog part of the optical transmitter 100 sometimes fluctuates depending on, for example, the changes in temperature and power supply voltage. In such a case, the output of the DAC 31 and the gain of the driving circuit 32 are readjusted and optimized.

A monitor signal is acquired in the monitoring control circuit 20 (S31). It is determined whether the input-output characteristic of the analog part has been brought into the nonlinear range based on the monitor signal (S32). In a case where an AC component whose cycle is the same as that of a rotation dither is not included in the monitor signal, that is, a voltage value representing optical output power or is less than or equal to a threshold value (NO in S32), it is determined that the input-output characteristic of the part from a DAC output to an optical output amplitude is in the linear range. The process from S31 to S32 is repeated.

In a case where an AC component whose cycle is the same as that of a rotation dither is included in the monitor signal, it is determined that the input-output characteristic of the part from a DAC output to an optical output amplitude has been brought into the nonlinear range (YES in S32). In this case, the monitoring control circuit 20 generates an alarm or a control signal (S33). Based on the alarm or the control signal, adjustment processing for reducing the gain of the driving circuit 32 is preformed (S34).

Subsequently, it is determined whether the amount of fluctuation in average optical output power representing the nonlinear range has decreased (S35). In a case where the amount of fluctuation in average optical output power has decreased (YES in S35), processing for reducing the gain of the driving circuit is continued until the power fluctuation does not appear since the direction of controlling the gain of the driving circuit is correct. Subsequently, the output of the DAC 31 is increased to the maximum value in a range where average optical output power does not fluctuate (S37).

In a case where the amount of fluctuation in average optical output power does not decrease in step S35, processing for reducing the output of the DAC 31 is performed until a power fluctuation does not appear (S38). Subsequently, the gain of the driving circuit 32 is increased to the maximum value in a range where average optical output power does not fluctuate (S39).

With the above-described control process, the gain of the driving circuit 32 and the output of the DAC 31 can be optimized and the input-output characteristic of the analog part of the optical transmitter 100 can be adjusted to be brought into the linear range, even if the input-output characteristic is brought into the nonlinear range under the influence of the changes in temperature and power supply voltage during operation.

As described above, the polarization state or phase of an optical output signal is periodically or repeatedly rotated and the fluctuation in optical output power of an optical modulator is monitored. With the above-described configuration and method, it is possible to accurately determine whether the input-output characteristic of the part from the output of a DAC to the optical output amplitude of an optical modulator is in a linear range during operation without superimposing a monitor signal on the driving amplitude of the optical modulator.

In a case where the input-output characteristic of the part from the output of a DAC to the output amplitude of an optical modulator is brought into the nonlinear range, it is possible to suppress the influence of, for example, age deterioration and the changes in temperature and power supply voltage by optimizing and readjusting at least one of the output of the DAC and the gain of a driving circuit. Even in a case where the input-output characteristic is in the linear range, it is possible to keep the wide linear range by readjusting the output of the DAC and the gain of the driving circuit to maximize them in the linear range at regular or irregular intervals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmitter comprising:
    a processor configured to receive an input data signal and perform rotation processing for periodically or repeatedly rotating a polarization state or phase of an optical output signal upon the input data signal;
    an optical modulator configured to modulate light transmitted from a light source based on the input data signal;
    a digital-to-analog converter configured to convert an output of the processor into an analog electric signal;
    a driving circuit configured to amplify an output of the digital-to-analog converter and drive the optical modulator; and
    a monitoring control circuit configured to:
    measure optical output power of the optical output signal, and
    adjust the at least one of the output of the digital-to-analog converter and the gain of the driving circuit when an alternating-current component of a frequency that is the same as a frequency of the rotation processing is included in the optical output power.

2. The optical transmitter according to claim 1, wherein, in a case when average optical output power increases, the monitoring control circuit reduces the at least one of the output of the digital-to-analog converter and the gain of the driving circuit.

3. The optical transmitter according to claim 1, wherein, in a case when average optical output power decreases, the monitoring control circuit reduces that at least one of the output of the digital-to-analog converter and the gain of the driving circuit.

4. The optical transmitter according to claim 1, wherein the monitoring control circuit determines that an input-output characteristic of a part from an output of the digital-to-analog converter to an output amplitude of the optical modulator has been brought into a nonlinear range when the alternating-current component is included in the optical output power, performs control for reducing the gain of the driving circuit, and then readjusts the output of the digital-to-analog converter and the gain of the driving circuit.

5. The optical transmitter according to claim 4, wherein the monitoring control circuit reduces the gain of the driving circuit until a power fluctuation does not appear in a case when the amount of fluctuation in average optical output power decreases after the monitoring control circuit has reduced the gain of the driving circuit, and then increases the output of the digital-to-analog converter to a maximum level in a range in which the power fluctuation is not generated.

6. The optical transmitter according to claim 4, wherein the monitoring control circuit reduces the output of the digital-to-analog converter until a power fluctuation does not appear in a case when the amount of fluctuation in average optical output power does not decrease after the monitoring control circuit has reduced the gain of the driving circuit, and then increases the gain of the driving circuit to a maximum value in a range in which the power fluctuation is not generated.

7. The optical transmitter according to claim 1, wherein, when the alternating-current component is not included in the optical output power, the monitoring control circuit increases the output of the digital-to-analog converter to a maximum linear range of an input-output characteristic of the driving circuit and increases the gain of the driving circuit to a maximum linear range of an input-output characteristic of the optical modulator.

8. A control method for an optical transmitter including a processor, an optical modulator, a digital-to-analog converter, a driving circuit, and a monitoring control circuit, the control method comprising:
    receiving, by the processor, an input data signal;
    performing, by the processor, rotation processing for periodically or repeatedly rotating a polarization state or phase of an optical output signal upon the input data signal;
    converting, by the digital-to-analog converter, an output of the processor into an analog electric signal;
    amplifying, by the driving circuit, an output of the digital-to-analog converter;
    driving, by the driving circuit, the optical modulator;
    measuring, by the monitoring control circuit, optical output power of the optical output signal output from the optical modulator; and
    adjusting, by the monitoring control circuit, at least one of the outputs of the digital-to-analog converter and a gain of the driving circuit when an alternating-current component of a frequency that is the same as a frequency of the rotation processing is included in the optical output power.

9. The control method according to claim 8, wherein, in a case when average optical output power increases, the adjusting reduces the at least one of the output of the digital-to-analog converter and the gain of the driving circuit.

10. The control method according to claim 8, wherein, in a case when average optical output power decreases, the adjusting reduces that at least one of the output of the digital-to-analog converter and the gain of the driving circuit.

11. The control method according to claim 8, wherein the monitoring includes determining that an input-output characteristic of a part from an output of the digital-to-analog converter to an output amplitude of the optical modulator has been brought into a nonlinear range when the alternating-current component is included in the optical output power, performing control for reducing the gain of the driving circuit, and then readjusting the output of the digital-to-analog converter and the gain of the driving circuit.

12. The control method according to claim 11, wherein the adjusting reduces the gain of the driving circuit until a power fluctuation does not appear in a case when the amount of fluctuation in average optical output power decreases after the adjusting has reduced the gain of the driving circuit, and then increases the output of the digital-to-analog converter to a maximum level in a range in which the power fluctuation is not generated.

13. The control method according to claim 11, wherein the adjusting reduces the output of the digital-to-analog converter until a power fluctuation does not appear in a case when the amount of fluctuation in average optical output power does not decrease after the adjusting has reduced the gain of the driving circuit, and then increases the gain of the driving circuit to a maximum value in a range in which the power fluctuation is not generated.

14. The control method according to claim 8, wherein, when the alternating-current component is not included in the optical output power, the adjusting increases the output of the digital-to-analog converter to a maximum linear range of an input-output characteristic of the driving circuit and increases the gain of the driving circuit to a maximum linear range of an input-output characteristic of the optical modulator.

* * * * *